(12) United States Patent
Fang

(10) Patent No.: US 10,726,035 B2
(45) Date of Patent: Jul. 28, 2020

(54) DATABASE ACCESS CONTROL METHOD AND APPARATUS

(71) Applicant: HUAWEI TECHNOLOGIES CO., LTD., Shenzhen, Guangdong (CN)

(72) Inventor: Houbo Fang, Jinan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 220 days.

(21) Appl. No.: 15/945,407

(22) Filed: Apr. 4, 2018

(65) Prior Publication Data

US 2018/0225344 A1    Aug. 9, 2018

Related U.S. Application Data

(63) Continuation of application No. PCT/CN2016/094641, filed on Aug. 11, 2016.

(30) Foreign Application Priority Data

Oct. 15, 2015    (CN) .......................... 2015 1 0674076

(51) Int. Cl.
| | | |
|---|---|---|
| *G06F 16/20* | (2019.01) | |
| *G06F 16/25* | (2019.01) | |
| *G06F 16/21* | (2019.01) | |
| *G06F 21/62* | (2013.01) | |
| *G06F 11/20* | (2006.01) | |
| *G06F 16/00* | (2019.01) | |

(52) U.S. Cl.
CPC .......... *G06F 16/25* (2019.01); *G06F 11/2058* (2013.01); *G06F 16/21* (2019.01); *G06F 21/62* (2013.01); *G06F 16/00* (2019.01)

(58) Field of Classification Search
CPC ........ G06F 16/21; G06F 16/214; G06F 16/25; G06F 21/62
USPC ........................................................ 707/781
See application file for complete search history.

(56) References Cited

U.S. PATENT DOCUMENTS

| | | | |
|---|---|---|---|
| 6,236,997 | B1 | 5/2001 | Bodamer et al. |
| 2003/0009477 | A1 | 1/2003 | Wilding et al. |

(Continued)

FOREIGN PATENT DOCUMENTS

| | | |
|---|---|---|
| CN | 101383814 A | 3/2009 |
| CN | 101556587 A | 10/2009 |

(Continued)

OTHER PUBLICATIONS

International Search Report issued in International Application No. PCT/CN2016/094641 dated Oct. 28, 2016, 13 pages.

(Continued)

*Primary Examiner* — Vincent F Boccio
(74) *Attorney, Agent, or Firm* — Fish & Richardson P.C.

(57) ABSTRACT

A database access control method and apparatus are disclosed. The method is applied to a database system. The database system has at least two databases, and the at least two databases include a first database and a second database. One example method includes: receiving an access request from the application, determining that a target database to which the access request is sent is the second database; establishing a database connection between a connection agent and the second database, and sending the access request to the second database by using the connection agent.

12 Claims, 9 Drawing Sheets

(56) References Cited

U.S. PATENT DOCUMENTS

| | | | |
|---|---|---|---|
| 2007/0022264 A1* | 1/2007 | Bromling | G06F 11/2064 |
| | | | 711/162 |
| 2007/0198524 A1 | 8/2007 | Branda et al. | |
| 2011/0274265 A1* | 11/2011 | Fan | H04L 41/082 |
| | | | 379/265.01 |
| 2014/0324910 A1* | 10/2014 | de Lavarene | G06F 16/90 |
| | | | 707/781 |
| 2015/0052258 A1* | 2/2015 | Johnson | H04L 67/141 |
| | | | 709/228 |
| 2015/0254257 A1 | 9/2015 | Kritchko et al. | |
| 2016/0203061 A1* | 7/2016 | Lee | G06F 16/1844 |
| | | | 714/19 |
| 2016/0306854 A1* | 10/2016 | Hegde | G06F 16/22 |
| 2018/0225344 A1 | 8/2018 | Fang | |

FOREIGN PATENT DOCUMENTS

| | | |
|---|---|---|
| CN | 101877002 A | 11/2010 |
| CN | 102033912 A | 4/2011 |
| CN | 202395813 U | 8/2012 |
| CN | 103488765 A | 1/2014 |
| CN | 103838781 A | 6/2014 |
| CN | 103902386 A | 7/2014 |
| CN | 104333512 A | 2/2015 |
| CN | 106599711 A | 4/2017 |

OTHER PUBLICATIONS

Chinese Office Action issued in Chinese Application No. 201510674076.7 dated Jan. 14, 2019, 8 pages.

XP055180622 Vasilios Andri Kopoulos et al., "How to adapt applications for the Cloud environment", Computing, dated Dec. 30, 2012, total 44 pages.

Extended European Search Report issued in European Application No. 16854823.8 dated May 16, 2018, 8 pages.

* cited by examiner

DATABASE ACCESS CONTROL METHOD AND APPARATUS

CROSS-REFERENCE TO RELATED APPLICATIONS

This application is a continuation of International Application No. PCT/CN2016/094641, filed on Aug. 11, 2016, which claims priority to Chinese Patent Application No. 201510674076.7, filed on Oct. 15, 2015, The disclosures of the aforementioned applications are hereby incorporated by reference in their entireties.

TECHNICAL FIELD

The present invention relates to the field of computer technologies, and in particular, to a database access control method and apparatus.

BACKGROUND

A system architecture for massive highly-concurrent Internet services mainly has several core focuses: performance, availability, scalability, and extensibility. To achieve system design objectives of the focuses, multiple database technologies such as an in-memory database, a relational database, and a not only structured query language (NoSQL) are usually introduced to a data layer. The NoSQL generally refers to a non-relational database, and an in-memory database includes products such as TT (TimesTen) produced by Oracle.

To ensure security and performance indicators, various databases usually set an upper limit of an indicator for a single node, for example, an upper limit of a quantity of database connections. TimesTen supports 2048 connections at most, and an Oracle (a relational database) database can support a relatively large quantity of connections. However, as a quantity of database connections increases, an Oracle database responds less quickly. Therefore, to ensure performance, the Oracle database also has a bottleneck in the quantity of database connections.

As services develop to be complex and diversified, with reference to development of distributed deployment of databases, a relationship between applications and databases has the following characteristics:

1. Databases of multiple types such as a relational database, an in-memory database, and an NoSQL coexist. Typical products are, for example, Oracle, TimesTen, Fastore, and Hadoop.

2. To adapt to clustering and high feasibility of applications, databases are usually deployed at multiple partition nodes in a partition division manner, providing capabilities of high-concurrency and high-availability.

3. Because applications become increasingly complex, one application may need to simultaneously access multiple types of databases and multiple partition nodes to obtain information.

For significantly increasing data and service requests, a database architecture of a large-scale application system is as follows:

The database architecture includes multiple databases, and data needed by applications is stored in the multiple databases in a partition division manner. The applications separately establish a database connection to the multiple databases. When extension needs to be performed, a quantity of applications and a quantity of databases are scaled up. A total quantity of database connections is a product of the quantity of the applications and the quantity of the databases, a quantity of database connections of a single database is equal to the quantity of the applications, and a quantity of database connections of a single application is equal to the quantity of the databases.

In the foregoing database architecture, a quantity of connections of each database is equal to a quantity of applications (or a quantity of processes) that need to access the database. Because a quantity of database connections is limited, applications cannot be scaled out linearly, and an application occupies a dedicated database connection of each database, resulting in a waste of database connection resources.

SUMMARY

Embodiments of the present invention provide a database access control method and apparatus, to implement linear scale-out of database applications and save database connection resources.

According to a first aspect, an embodiment of this application provides a database access control method, applied to a database system, where the database system has at least two databases, and the at least two databases include a first database and a second database; and a database connection is established between an application and the first database, where the method includes:

receiving, by a data access layer, an access request from the application, and determining that a target database to which the access request is sent is the second database; and establishing, by the data access layer, a database connection between a connection agent and the second database, and sending the access request to the second database by using the connection agent; or determining, by the data access layer, that a target database to which the access request is sent is the first database; and sending, by the data access layer, the access request to the first database by using the database connection between the application and the first database.

The access request only needs to be used to determine a target database of the access request and no limitation shall be imposed on understanding thereof. Connection to the first database that requires no relay by a connection agent is a high-speed connection of a high-speed direct connection; connection to the second database that requires relay by a connection agent is a low-speed connection.

In a possible design, a database connection of a high-speed direct connection may be pre-configured, or managed by a same data access layer. In a manner of direct management by the data access layer, the database connection of the high-speed direct connection may be more conveniently added and deleted subsequently. The pre-configuration solution is used in an application scenario in which an application has a relatively fixed requirement on high-speed access to a database, and management of an entire database system architecture may be simpler. Specifically, that a database connection is established between an application and the first database includes:

determining an access speed requirement of the access request, and if the access speed requirement belongs to a high-speed direct connection type, establishing the database connection between the application and the first database; or a primary database of the application is the first database, and the database connection between the application and the first database is a pre-configured database connection.

In a possible design, in the solution of managing the database connection of the high-speed direct connection by a same data access layer, a solution of how to establish a high-speed direct connection is further provided as follows: Before the establishing the database connection between the application and the first database, the method further includes:

determining that currently the database connection between the application and the first database does not exist, and that the first database has not reached a maximum quantity of connections, and establishing the database connection between the application and the first database. If the database connection between the application and the first database already exists, a new high-speed direct connection does not need to be established. If the first database has reached the maximum quantity of connections supported by the first database, no high-speed direct connection can be established.

In a possible design, switching from a low-speed access to a database implemented by using a connection agent to a high-speed access to a database implemented by using a high-speed direct connection is further provided as follows: Before the establishing, by the data access layer, a database connection between a connection agent and the second database, the method further includes:

determining whether a quantity of connections of the second database is less than a second threshold and whether traffic or frequency of access by the application to the second database is greater than a third threshold, and if yes, establishing a database connection between the application and the second database; otherwise, performing the establishing a database connection between a connection agent and the second database. In this embodiment, if the database has relatively low load and the application accesses the database relatively frequently, it may be considered that a faster access path is provided to the application. The second threshold and the third threshold are tipping points for controlling the switching from the connection agent to the high-speed direct connection. An effect brought by specific setting of the thresholds may be obtained by means of theoretical derivation. Specific values of the thresholds may be set based on experience, or may be determined based on a load capability of a system.

In a possible design, after the establishing a database connection between the application and the second database, the method further includes:

determining whether the quantity of connections of the second database is greater than a fourth threshold and whether the traffic or the frequency of access by the application to the second database is less than a fifth threshold, where the fourth threshold is greater than or equal to the second threshold, and the fifth threshold is less than or equal to the third threshold; and if yes, breaking the database connection between the application and the second database, and establishing the database connection between the connection agent and the second database. Specific values of the fourth threshold and the fifth threshold may be set based on experience, or may be determined based on a load capability of a system. The specific values are not uniquely limited in this embodiment.

In a possible design, before the establishing, by the data access layer, a database connection between a connection agent and the second database, the method further includes:

obtaining, by the data access layer, an operating state of a current existing connection agent, and determining a target connection agent, where the target connection agent is a connection agent whose current operating state is idle; and establishing a communication connection between the application and the target connection agent, or if there is no idle connection agent and the quantity of connections that have been established by the second database has not exceeded a maximum quantity of connections supported by the second database, establishing a new connection agent as the target connection agent; and the establishing, by the data access layer, a database connection between a connection agent and the second database, and sending the access request to the second database by using the connection agent includes: establishing a database connection between the target connection agent and the second database, and sending the access request to the second database by using the target connection agent. In this embodiment, if there is no idle connection agent, and establishment of a new connection agent is not established, an idle connection agent may be waited for until a waiting time has expired.

In a possible design, the method further includes:

recording the current existing connection agent, and recording a current operating state reported by the connection agent; and when a quantity of connection agents whose current operating states are idle is greater than a first threshold, deleting a redundant connection agent, where the redundant connection agent is determined according to a rule of balance between quantities of connections of databases. The first threshold may be set to a proportion, that is, a proportion of idle connection agents to total connection agents. Alternatively, the first threshold may be a value of a quantity. For example, if a quantity of the idle connection agents exceeds a value, some connection agents are deleted.

In a possible design, the method further includes:

receiving result data corresponding to the access request, and if a database connection between a source end of the result data and the application exists, routing the result data to the application; otherwise, sending the result data to the application by using the connection agent. In some access requests, the result data may not be returned, and therefore, there may not be a step of returning the result data.

According to a second aspect, an embodiment of this application provides a database access control apparatus, applied to a database system, where the database system has at least two databases, and the at least two databases include a first database and a second database; and a database connection is established between an application and the first database, where the database access control apparatus includes:

a receiving unit, configured to receive an access request from the application;

a database determining unit, configured to determine that a target database to which the access request is sent is the second database;

a connection establishment unit, configured to establish a database connection between a connection agent and the second database; and a request sending unit, configured to send the access request to the second database by using the connection agent, where the database determining unit is further configured to determine that the target database to which the access request is sent is a first database; and the request sending unit is configured to send the access request to the first database by using the database connection between the application and the first database.

The access request only needs to be used to determine a target database of the access request and no limitation shall be imposed on understanding thereof. Connection to the first database that requires no relay by a connection agent is a high-speed connection of a high-speed direct connection; connection to the second database that requires relay by a connection agent is a low-speed connection.

In a possible design, a database connection of a high-speed direct connection may be pre-configured, or managed by a same data access layer. In a manner of direct management by the data access layer, the database connection of the high-speed direct connection may be more conveniently added and deleted subsequently. The pre-configuration solution is used in an application scenario in which an application has a relatively fixed requirement on high-speed access to a database, and management of an entire database system architecture may be simpler. Specifically, the apparatus further includes:

a requirement determining unit, configured to determine an access speed requirement of the access request, where the connection establishment unit is further configured to: if the access speed requirement belongs to a high-speed direct connection type, establish the database connection between the application and the first database; or a primary database of the application is the first database, and the database connection between the application and the first database is a pre-configured database connection.

In a possible design, in the solution of managing the database connection of the high-speed direct connection by a same data access layer, a solution of how to establish a high-speed direct connection is further provided as follows: The connection establishment unit is further configured to: before establishing the database connection between the application and the first database, determine that currently the database connection between the application and the first database does not exist, and that the first database has not reached a maximum quantity of connections, and establish the database connection between the application and the first database.

If the database connection between the application and the first database already exists, a new high-speed direct connection does not need to be established. If the first database has reached the maximum quantity of connections supported by the first database, no high-speed direct connection can be established.

In a possible design, switching from a low-speed access to a database implemented by using a connection agent to a high-speed access to a database implemented by using a high-speed direct connection is further provided as follows: The apparatus further includes:

a determining unit, configured to: before the database connection between the connection agent and the second database is established, determine whether a quantity of connections of the second database is less than a second threshold and whether traffic or frequency of access by the application to the second database is greater than a third threshold, where the connection establishment unit is configured to: if a result determined by the determining unit is yes, establish a database connection between the application and the second database; otherwise, establish the database connection between the connection agent and the second database. In this embodiment, if the database has relatively low load and the application accesses the database relatively frequently, it may be considered that a faster access path is provided to the application. The second threshold and the third threshold are tipping points for controlling the switching from the connection agent to the high-speed direct connection. An effect brought by specific setting of the thresholds may be obtained by means of theoretical derivation. Specific values of the thresholds may be set based on experience, or may be determined based on a load capability of a system.

In a possible design, the determining unit is further configured to: after the database connection between the application and the second database is established, determine whether the quantity of connections of the second database is greater than a fourth threshold and whether the traffic or the frequency of access by the application to the second database is less than a fifth threshold, where the fourth threshold is greater than or equal to the second threshold, and the fifth threshold is less than or equal to the third threshold; and the connection establishment unit is configured to: if a result determined by the determining unit is yes, break the database connection between the application and the second database, and establish the database connection between the connection agent and the second database. Specific values of the fourth threshold and the fifth threshold may be set based on experience, or may be determined based on a load capability of a system. The specific values are not uniquely limited in this embodiment.

In a possible design, the apparatus further includes:

a state obtaining unit, configured to: before the database connection between the connection agent and the second database is established, obtain an operating state of a current existing connection agent; and an agent determining unit, configured to determine a target connection agent, where the target connection agent is a connection agent whose current operating state is idle, where the connection establishment unit is configured to: establish a communication connection between the application and the target connection agent, or if there is no idle connection agent and the quantity of connections that have been established by the second database has not exceeded a maximum quantity of connections supported by the second database, establish a new connection agent as the target connection agent; and establish a database connection between the target connection agent and the second database; and the request sending unit is configured to send the access request to the second database by using the target connection agent. In this embodiment, if there is no idle connection agent, and establishment of a new connection agent is not established, an idle connection agent may be waited for until a waiting time has expired.

In a possible design, the apparatus further includes:

a state recording unit, configured to: record the current existing connection agent, and record a current operating state reported by the connection agent; and a connection updating unit, configured to: when a quantity of connection agents whose current operating states are idle is greater than a first threshold, delete a redundant connection agent, where the redundant connection agent is determined according to a rule of balance between quantities of connections of databases. The first threshold may be set to a proportion, that is, a proportion of idle connection agents to total connection agents. Alternatively, the first threshold may be a value of a quantity. For example, if a quantity of the idle connection agents exceeds a value, some connection agents are deleted.

In a possible design, the apparatus further includes:

a data receiving unit, configured to receive result data corresponding to the access request; and a data sending unit, configured to: if a database connection between a source end of the result data and the application exists, route the result data to the application; otherwise, send the result data to the application by using the connection agent. In some access requests, the result data may not be returned, and therefore, there may not be a unit related to returning the result data.

As may be seen from the foregoing technical solutions, the embodiments of the present invention have the following advantages: An application and a database are connected in two modes. One mode is a high-speed direct connection mode, and in this mode, a database connection is established between the application and the database. The other mode is a relatively-low-speed connection mode, and in this mode, a connection to the database is established by means of a connection agent. In this way, not only a requirement on high-speed access may be ensured, but also convergence of a database connection may be implemented by using the connection agent, so as to reduce a required quantity of database connections. Therefore, linear scale-out of database applications can be implemented, and database connection resources can be saved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
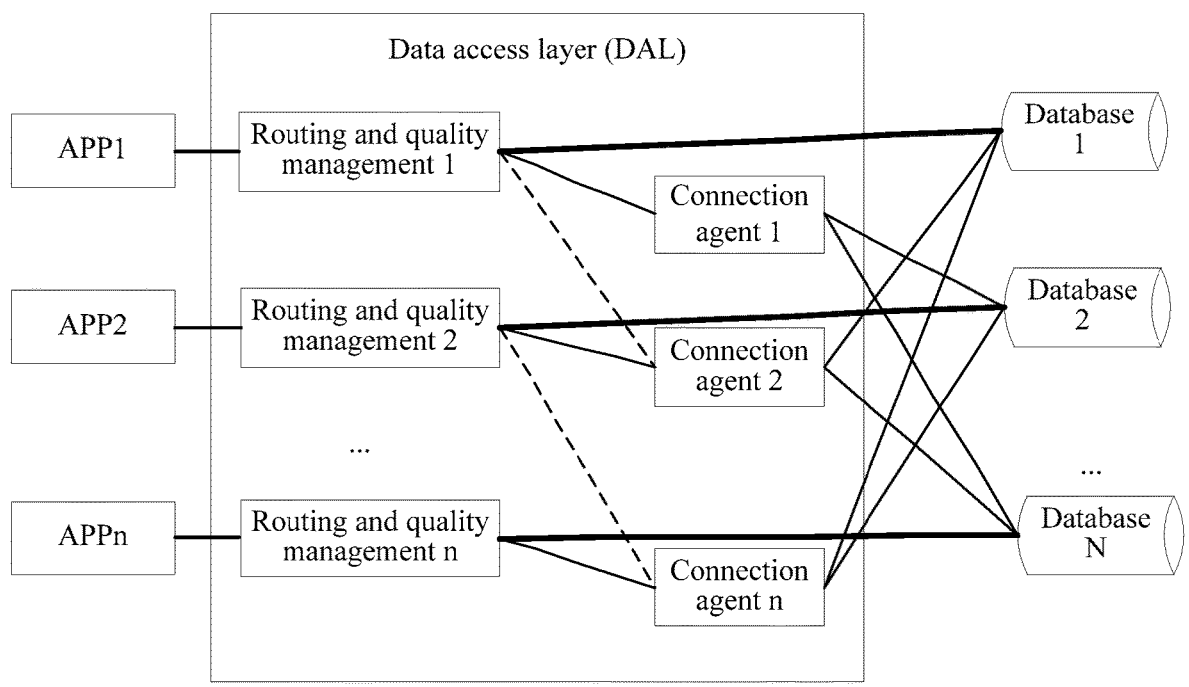
FIG. 1 is a schematic diagram of a database architecture according to an embodiment of the present invention.

A solution of a database architecture in the embodiments of the present invention is described in detail below:

As shown in FIG. 1, FIG. 1 is a schematic diagram of a database architecture that includes an application (APP) according to an embodiment of the present invention. A data access layer (DAL) is added between an APP and a database, and routing and speed quality of service (QoS) management and database connection convergence are performed by using the data access layer (DAL). The speed QoS management is quality management shown in FIG. 1. The data access layer (DAL) mainly includes a routing and speed QoS management function and a connection convergence agent function that are respectively implemented by a routing and quality management module and a connection agent module.

FIG. 1 shows m APPs, N routing and quality managements, L connection agents, and P databases. Each APP may access any database. In the schematic diagram of the database architecture, an APP and a database are connected in two modes. In one connection mode, the APP is connected to the database by means of a routing and quality management. This connection mode has a fast speed and is a connection mode of a high-speed direct connection. In the other connection mode, the APP is connected to a connection agent by means of a routing and quality management and then accesses the database by means of the connection agent. In this connection mode, a connection to a database is established by using an agent and a speed is low. In addition, dashed lines between the routing and quality managements and the connection agents show emergency paths (emergency connections), the emergency path is similar to a connection to the database by using the agent, and details are not described herein again. It should be noted that an APP is connected to some databases by using a high-speed direct connection and is connected to other databases by using an agent. FIG. 1 shows only an example and it should not be considered that FIG. 1 constitutes any limitation.

In the database architecture, a same APP may access different databases by using different paths and different manners, and may select paths such as a high-speed direct connection, an access agent, or an emergency agent.

Different APPs may access a same database by using different paths and different manners, and may select paths such as a high-speed direct connection, an access agent, or an emergency agent.

Database connection convergence and access speed QoS scheduling are implemented by using the data access layer (DAL), reaching a balance between a system application speed and overheads.

Functions and principles of the data access layer (DAL) are described as follows:

The data access layer (DAL) is a product of development of a distributed database access framework. A database system mainly aims to gather operating data of an organization (an enterprise, a company, or a conglomerate), so as to provide centralized data access. Cloudification and clustering of system applications, that is, decentralization, is contrary to the idea of centralization. The data access layer (DAL) attempts to coordinate centralization and decentralization, so as to implement access transparency (data locations/distribution/storage independence is blocked) of the applications to data. For details of the access transparency, refer to a description in Table 1 below.

TABLE 1

| Transparency | Description |
| --- | --- |
| Location independence | Whether data is stored remotely or locally is transparent to an application. Both centralized deployment of the data and the application, and separate deployment of the data and the application are supported. Code of the application can be adaptive to the two types of networking without being modified. |
| Distribution independence | Data is distributed in multiple databases and is transparent to an application. For example, to search for all users in a bill cycle, although user information in the same bill cycle is distributed in multiple databases, for the application, it seems that query is performed in a centralized database. |
| Storage independence | Whether data is stored in an in-memory database, a physical database, an NoSQL, a file, or a medium such as a cache is transparent to an application. |

Figure 2:
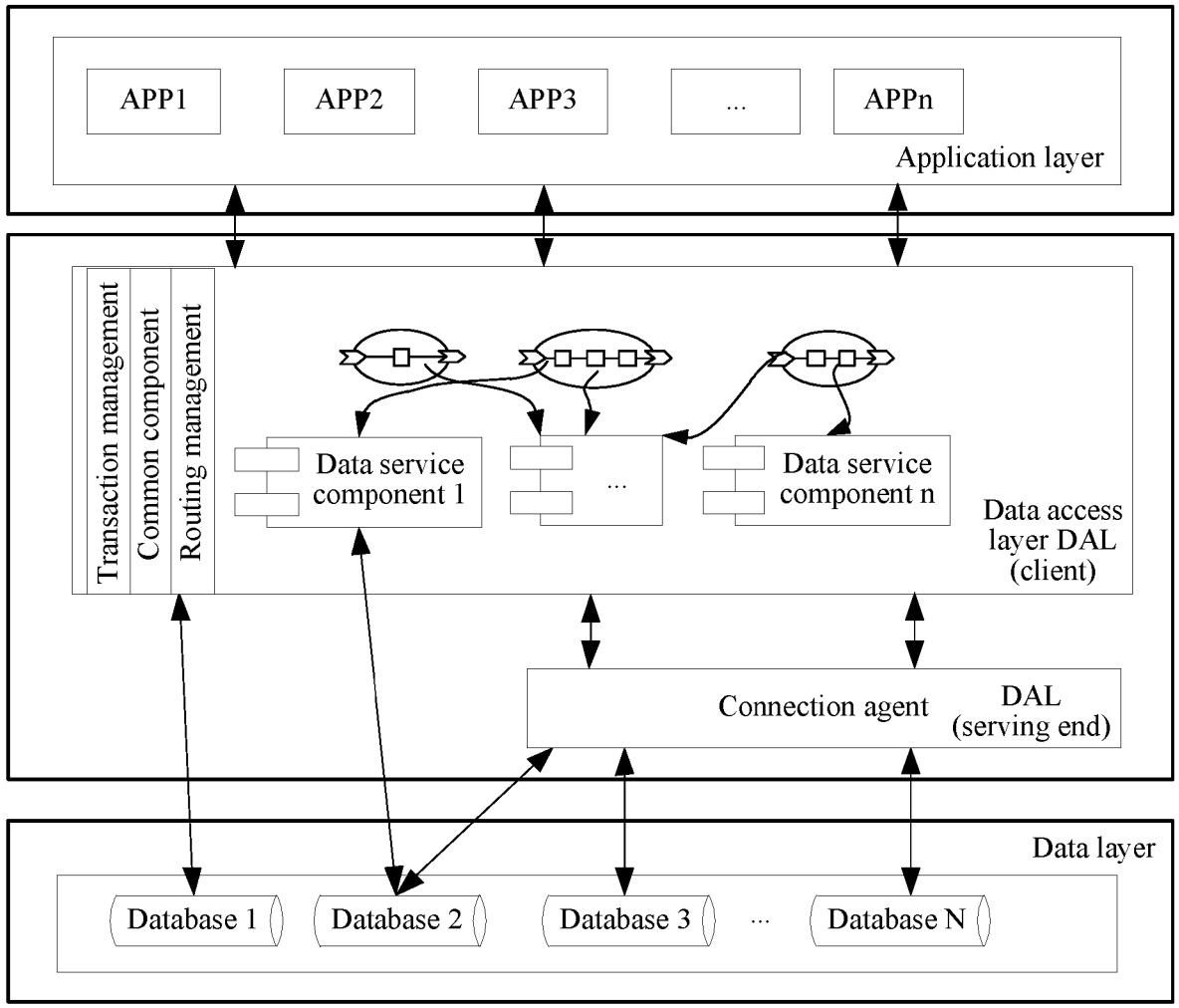
FIG. 2 is a schematic diagram of a database architecture according to an embodiment of the present invention.

Location relationships between the data access layer and an application layer and a data layer are described as follows:

FIG. 2 is a schematic diagram of another database architecture according to an embodiment of the present invention. Compared with the example of FIG. 1 that puts emphasis on the connection mode, FIG. 2 puts more emphasis on layers of a database architecture. In addition, compared with FIG. 1, FIG. 2 further provides optional components of a DAL layer of the layers. Details are as follows:

An application layer: The application layer mainly includes various applications (APP) and services having particular functions, for example, applications and services such as rent calculation, credit control, free resources, a reminder, billing rewards, and batch account settling. N APPs are shown in FIG. 2.

A data access layer (DAL): The same data access layer provides routing management, transaction management, common components, and processing such as data manipulation language (data manipulation language, DML) statement execution. The application layer interacts with the database by using a data service component, thereby simplifying logic of the application. FIG. 2 shows that a database 1 has a high-speed direct connection, a database 2 has both a high-speed direct connection and an agent connection, and other databases have an agent connection.

A data layer: The data layer provides centralized data access services, an in-memory database, a physical database, an NoSQL (a relational database), and a cache are included at the data layer together, and manages a connection to the database and exchanges data with the database by using the same data access layer.

Figure 3:
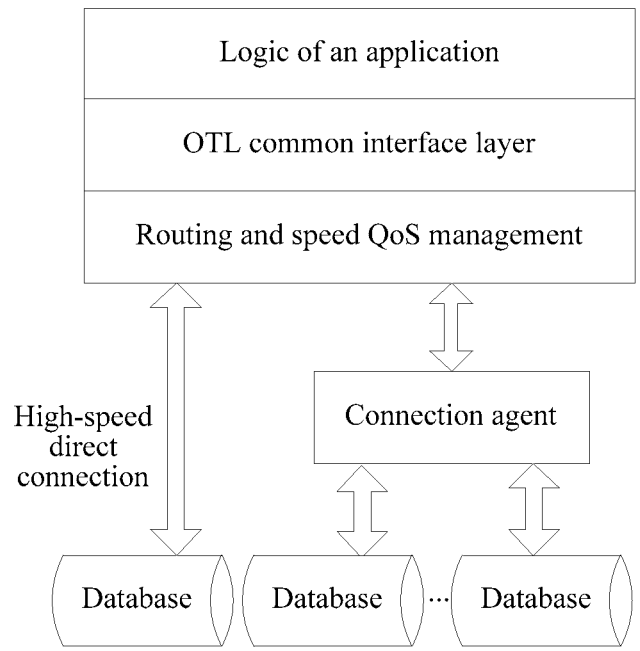
FIG. 3 is a schematic logic diagram of accessing by an APP to a database according to an embodiment of the present invention.

A logic diagram of accessing by an APP to a database is shown in FIG. 3, and details are as follows:

A logic of an application is adapted to multiple types of heterogeneous databases by using a common interface layer, such as an open-source OTL (which is an abbreviation of Oracle, Odbc, and DB2-CLI Template Library and is a template library for manipulating a relational database in C++ compiling), so that an application transparently accesses data, and the application and the data are separated from each other.

The OTL common interface layer is adapted to the data access layer (DAL) below the OTL common interface layer, thereby implementing routing and speed QoS management and connection convergence. In the logic diagram shown in FIG. 3, the routing and speed QoS management (that has a function the same as that of the routing and quality management shown in FIG. 1) performs, according to policies by using a connection mode of a high-speed direct connection, a high-speed access to nodes of in-memory databases that are accessed frequently and that have a large traffic volume, and accesses, by using the connection agent, databases that are accessed less frequently, thereby implementing multiplex and convergence of the database connection by using the connection agent.

Figure 4:
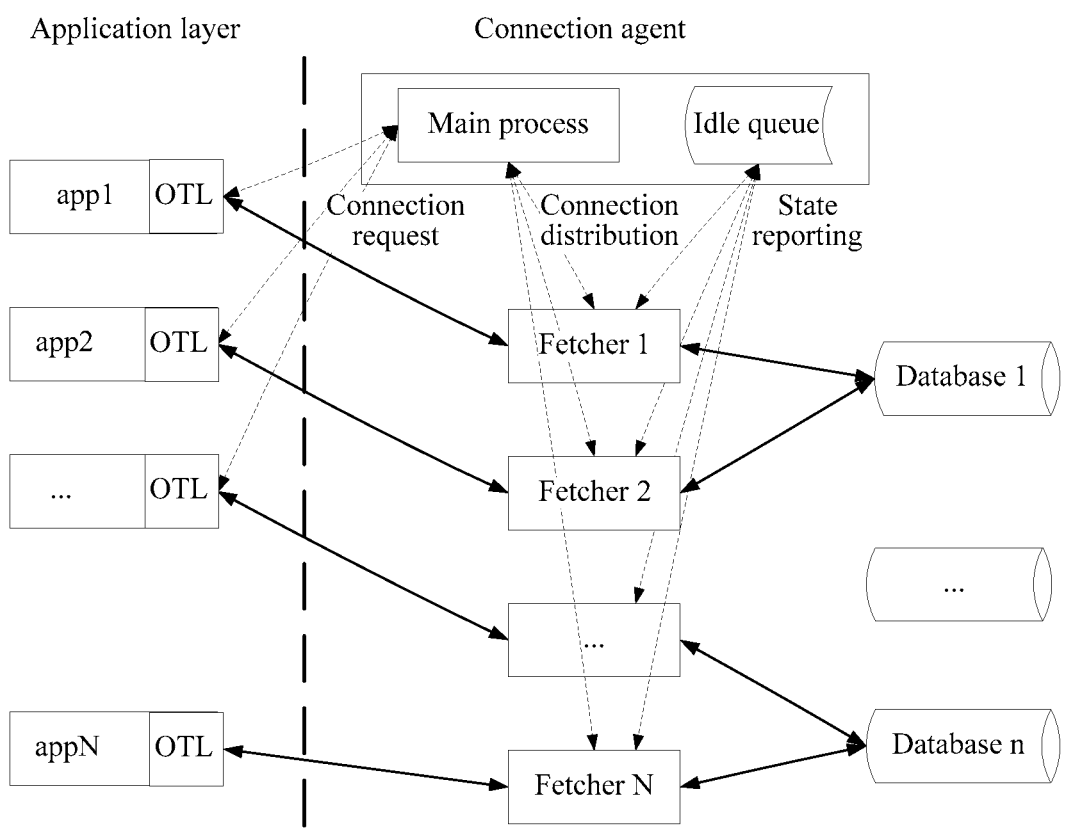
FIG. 4 is a schematic structural diagram of an operating principle of a database connection agent according to an embodiment of the present invention.

For an operating principle of a database connection agent, refer to FIG. 4 and details are as follows:

A description of a process:

1. The database connection agent includes one main process (or main thread) and multiple subprocesses (or subthreads). One subprocess (a fetcher shown in FIG. 4) may occupy one database connection. It is assumed that there are N subprocesses and M processes of applications (APP) in an application cluster, where usually M>N. A quantity of database connections is reduced by means of connection multiplex.

2. APPs send access requests to a serving end of the same connection agent by using a socket (socket, which is one end of a bidirectional communication connection), and the access requests are received and distributed by the same main process. In a process of initially establishing a connection, the access request may be a connection request that is dedicated to establish a connection, as shown in FIG. 4, or the access request may have a connection request function.

3. The main process receives the connection requests, and distributes the connection request to an idle subprocess for processing if the idle subprocess exists; or waits in a queue if there is no idle subprocess, until there is an idle subprocess that may be scheduled or a time has expired. In addition, a new subprocess may further be added to respond to the connection request in time. After a subprocess receives a distributed connection task, the subprocess may establish a connection to an APP and a connection to a database.

4. The subprocesses (the fetcher fetcher shown in FIG. 4) are responsible for task processing and communication with the APPs, and in the process, the subprocesses serve as an agent for communication between the APPs and the databases. After finishing serving as an agent, the subprocesses report states to the main process, register idle states of the subprocesses, and return a supervision right of socket identifiers (socketid) of the APPs to the main process. On the side of the main process, an idle queue in which the subprocesses are in the idle state information may be maintained.

In the foregoing solution, the connection agent may control a quantity of subprocesses and a size of a database connection pool, so as to control access traffic of a database node and avoid a problem of overload caused by an excessively large quantity of connections.

Figure 5:
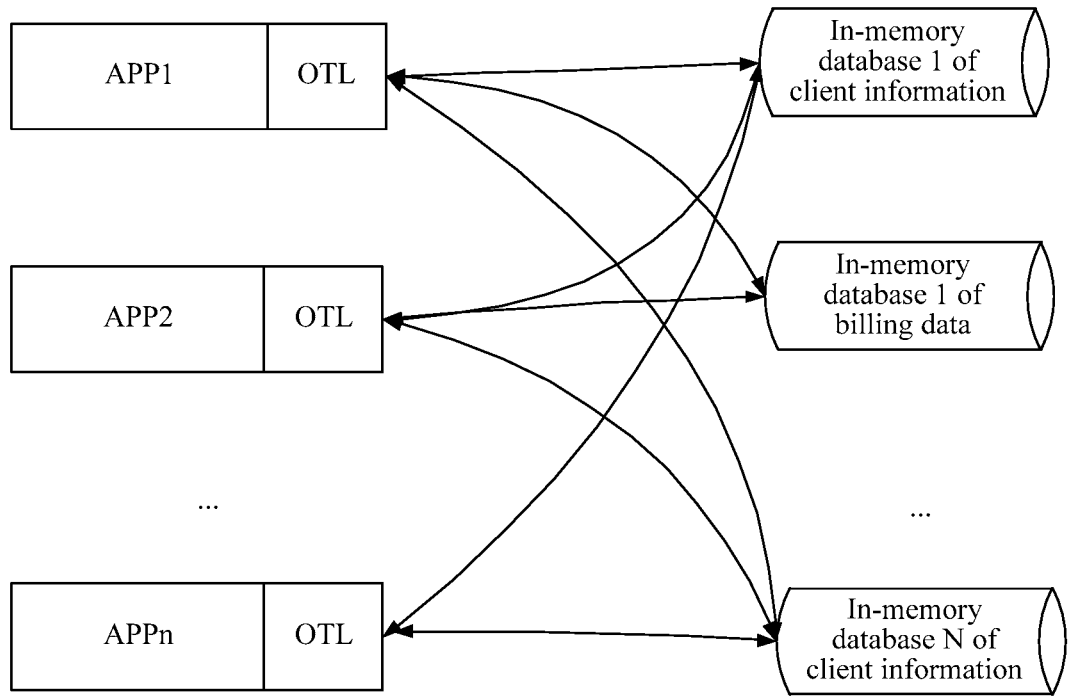
FIG. 5 is a schematic structural diagram of an operating principle of a database connection agent according to an embodiment of the present invention.

By means of this embodiment of the present invention, an effect of convergence of the database connection is analyzed as follows:

For example, an application cluster includes eight blades, each blade is deployed with 70 applications APPs, and a quantity of connections of each database is calculated as follows:

In the structure shown in FIG. 5, an APP is connected to a database in a connection mode of a high-speed direct connection by using an OTL. The database shown in FIG. 5 includes database types such as an in-memory database of client information and an in-memory database of billing data.

A quantity of database connections=a quantity of blades in a cluster*a quantity of application processes of each blade=8*70=560 (database connections).

In this embodiment of the present invention:

Data partitions (branch nodes, that is, distributed databases) are usually divided according to a partition key. When accessing data, if an application relatively frequently accesses a primary bearing database (assuming accounting for 70% of total access traffic), the application may continuously obtain a high-speed characteristic in the high-speed direct connection mode. If traffic of access by an application to a database of another partition is relatively small (assuming accounting for 30% of total access traffic), the application may perform multiplex by using the connection agent.

$$\begin{aligned} &\text{A total quantity of database connections} = \\ &\quad \text{a quantity of high-speed direct connections} + \\ &\quad \text{a proportion of connection agents} \times \text{a quantity} \\ &\quad \text{of connection agents} \times \text{a security coefficient} = \\ &\quad 70 \text{ (a quantity of processes of each blade)} + 0.3^*(560 - 70)^*1.5 = \\ &\quad 291 \text{ (database connections)}. \end{aligned}$$

A reduced quantity of connections: 560−291=269. On a premise of ensuring speed QoS, connections may be reduced by 48%, that is, approximately one half of the quantity of connections may be reduced.

An analysis on speed QoS is shown in Table 2:

TABLE 2

| | Processing speed of a high-speed direction connection (a base) | Average value of processing speeds (a higher effect of convergence and multiplex indicates a lower speed) of a connection agent. | Mixed mode in which a primary database uses an exclusive connection and a database that is not a primary database uses a connection agent (assuming that an access rate of the database that is not a primary database is 0.3) |
|---|---|---|---|
| Processing speed of a single process | 1 | 0.5 | 0.85 |

A description of Table 2 is as follows:

A formula for calculating a processing speed in a mixed mode in which a primary database uses an exclusive connection and a database that is not a primary database uses a DAL connection agent (assuming that an access rate of the database that is not a primary database is 0.3) is as follows: an exclusive connection rate*an access proportion+a connection agent rate*an access proportion=0.7*1+0.3*0.5=0.85.

A processing speed of a single process decreases in the DAL connection agent mode. This is because an agent step is added and socket interaction is needed, increasing a delay, and decreasing a processing speed of a single process.

A comprehensive processing capability (Transaction Per Second, TPS, that is: a quantity of transactions processed per second)=a quantity of processes*a processing speed of a single process. After DAL reconstruction is used, in a scenario in which quantities of database connections are the same (multiplex of the database connection is implemented), more processing processes may be deployed, thereby theoretically achieving a higher total throughput capability.

To be compatible with an existing system and reduce risks and difficulties in implementation to utmost extent, the mixed mode in which a primary database uses an exclusive connection, and a database that is not a primary database uses a DAL connection agent is used, maintaining balance of overall performance.

It may be found that the foregoing database architecture has at least the following values:

1. A speed QoS policy management is supported. For a database (such as TT (timesten, an in-memory database product produced by Oracle) and a Fastore (a relational database system that is developed by Huawei Technologies and that is based on design of a physical memory) in-memory database that has a high-speed interface, there is a direct connection characteristic. A speed of a direct connection is six times faster than that of a client/server (Client, server, C/S) mode, and a solution of a high-speed direct connection mode is supported, avoiding a decrease in speed caused by an agent-only mode.

2. When an application accesses multiple databases, it is supported that different databases use different connection modes. A database having a large traffic volume may use a high-speed direct connection, and a database having a small traffic volume may use a connection agent.

3. Dynamic adjustment on a connection mode of a database is supported, thereby balancing a speed and convergence of a quantity of database connections.

4. The application layer does not need to be reconstructed. Routing encapsulation and connection mode control and management are performed only at the OTL common interface layer, so that code of an existing system and previous service accumulation are used to utmost extent, project duration for reconstruction is shortened, and costs for reconstruction of the system architecture are reduced.

Based on the description of the embodiments of the present invention, an embodiment of the present invention provides a database access control method, applied to a database system, where the database system has at least two databases, and the at least two databases include a first database and a second database; and a database connection is established between an application and the first database. For a database system architecture, refer to FIG. 1. In FIG. 1, for an APP1, a database 1 is a first database of the APP1, and other databases are second databases. It should be noted that if the APP1 and the database 1 are in a pre-configured high-speed direct connection, a routing and quality management 1 may not be passed by, that is, relay by a data access layer is not needed. Therefore, the structure in FIG. 1 is used as an example and should not be understood as a limitation to uniqueness of a database architecture in this embodiment of the present invention.

Figure 6:
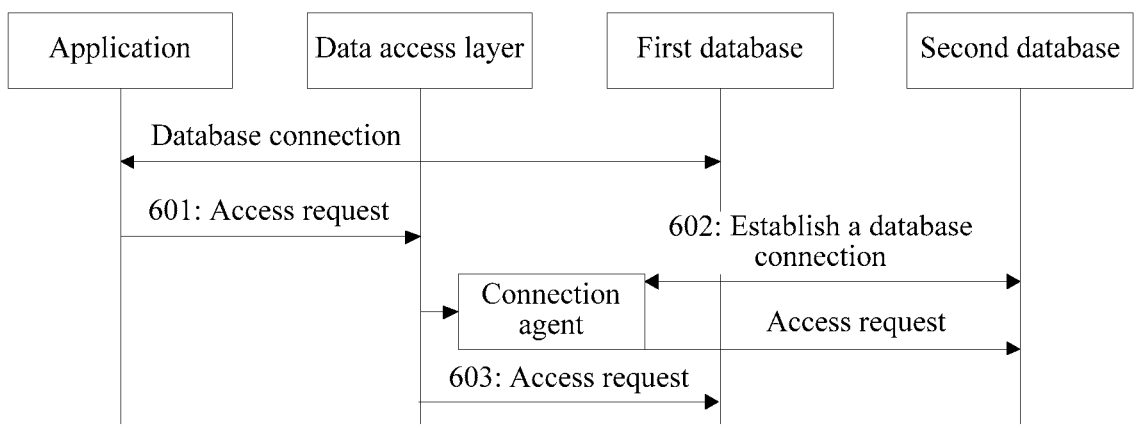
FIG. 6 is a schematic flowchart of a method according to an embodiment of the present invention.

A specific data access procedure is shown in FIG. 6 and includes the following steps.

601: A data access layer receives an access request from an application, and determines that a target database to which the access request is sent is a second database.

In this embodiment, the access request may be a database access request that is sent by the application to the database, or may be a database connection establishment request that is sent to the database, or may be a request to search for, modify, or update data in the database. The access request only needs to be used to determine a target database of the access request and no limitation shall be imposed on understanding thereof. In the first database and the second database, "first" and "second" are used for distinguishing two different databases, and should not be understood as other limitative meanings.

602: The data access layer establishes a database connection between a connection agent and the second database, and sends the access request to the second database by using the connection agent.

In this embodiment of the present invention, an application and a database are connected in two modes. One mode is a high-speed direct connection mode, and in this mode, a database connection is established between the application and the database. The other mode is a relatively-low-speed connection mode, and in this mode, a connection to the database is established by means of a connection agent. In this way, not only a requirement on high-speed access may be ensured, but also convergence of a database connection may be implemented by using the connection agent, so as to reduce a required quantity of database connections. Therefore, linear scale-out of database applications can be implemented, and database connection resources can be saved.

Further, this embodiment of the present invention further provides a processing procedure in which the application accesses the database by using a high-speed direct connection mode. Details are as follows: The method further includes the following steps.

603: The data access layer determines that a target database to which the access request is sent is a first database; and the data access layer sends the access request to the first database by using the database connection between the application and the first database.

The step in this embodiment is performed after the "receiving, by a data access layer, an access request from an application". This step and the "determining that a target database to which the access request is sent is a second database" belong to different branches. It does not indicate that step 603 is a step that needs to be performed after the "determining that a target database to which the access request is sent is a second database" in step 601 is performed or after step 602 is performed.

In this embodiment of the present invention, a database connection of a high-speed direct connection may be pre-configured, or managed by a same data access layer. In a manner of direct management by the data access layer, the database connection of the high-speed direct connection may be more conveniently added and deleted subsequently, so as to provide better QoS management. The pre-configuration solution is used in an application scenario in which an application has a relatively fixed requirement on high-speed access to a database, and management of an entire database system architecture may be simpler. Details are as follows: That a database connection is established between an application and the first database includes:

determining an access speed requirement of the access request, and if the access speed requirement belongs to a high-speed direct connection type, establishing the database connection between the application and the first database; or a primary database of the application is the first database, and the database connection between the application and the first database is a pre-configured database connection.

In the solution of this embodiment in which a connection mode is determined based on an access speed, an application usually has a speed requirement on database access. Some applications are sensitive to a response speed, and therefore require a fast database access speed. Other applications do not have a high requirement on a response speed, and may require a slow database access speed. In addition to a requirement of an application, properties of users of the application result in different services. For example, to provide a better service to a senior member, a fast database access speed is required. On the contrary, an access speed may be slow for a common user. Related information of an access speed requirement may be identified in the access request in a form of an identifier, or the data access layer may determine, according to a sender of the access request, a speed requirement corresponding to the sender. A manner for determining the access speed requirement is not uniquely limited in this embodiment of the present invention.

In the solution based on pre-configuration in this embodiment, in a database establishment process, data corresponding to applications may be distinguished in advance. Main data of some applications is stored in a database, so that these applications access the database frequently. For these applications, it is required that these applications access the database relatively fast. Correspondingly, databases that have a little data may be accessed relatively slowly. In this case, a database connection mode may be determined as the high-speed direct connection or the low-speed agent by means of pre-configuration.

In the two processes for establishing the database connection of the high-speed direct connection, the former may be performed after step 601 of "receiving, by a data access layer, an access request from the application", and the latter may be configured before step 601.

In the solution of managing the database connection of the high-speed direct connection by a same data access layer, this embodiment of the present invention further provides a solution of how to establish a high-speed direct connection. Details are as follows: Before the establishing the database connection between the application and the first database, the method further includes:

determining that currently the database connection between the application and the first database does not exist, and that the first database has not reached a maximum quantity of connections, and establishing the database connection between the application and the first database.

If a needed connection between the application and the database already exists, there is no need to establish one more connection to avoid waste. For the database, a quantity of database connections supported by the database is limited, and excessive database connections may result in a decrease in performance of the database. Therefore, whether the database reaches a maximum quantity of connections is determined in this embodiment. Difference databases have different maximum quantities of connections. For some databases, more connections to the databases result in low performance of the databases if there is no maximum quantity of connections. Therefore, a maximum quantity of connections herein may be a preset threshold of a highest quantity of connections for ensuring an access speed. The step in this embodiment is performed before the "establishing the database connection between the application and the first database".

It may be understood that if the database connection between the application and the first database already exists, a new high-speed direct connection does not need to be established. If the first database has reached the maximum quantity of connections supported by the first database, no high-speed direct connection can be established.

This embodiment of the present invention further provides switching from a low-speed access to a database implemented by using a connection agent to a high-speed access to a database implemented by using a high-speed direct connection. Details are as follows: Before the establishing, by the data access layer, a database connection between a connection agent and the second database, that is, before step 602 and after the "determining that a target database to which the access request is sent is the second database", the method further includes:

determining whether a quantity of connections of the second database is less than a second threshold and whether traffic or frequency of access by the application to the second database is greater than a third threshold, and if yes, establishing a database connection between the application and the second database; otherwise, performing the establishing a database connection between a connection agent and the second database.

If the database has relatively low load and the application accesses the database relatively frequently, it may be considered that a faster access path is provided to the application. Therefore, this embodiment provides the foregoing solutions. The second threshold is a threshold used to determine, by using a quantity of connections, that the database has relatively low load. The threshold may be determined based on experience and is not uniquely limited in this embodiment. The third threshold is a threshold for determining that the application accesses a database frequently. High access traffic and high access frequency may also be determined based on experience and may vary with different fields such as a telephone field and an instant messaging field. A higher threshold may be set for instant messaging. Therefore, different thresholds are set for different fields. Specific thresholds are not uniquely limited in this embodiment. After the thresholds are set, an entire system may be tested to determine whether the thresholds are appropriate. The thresholds may be adjusted if they are not appropriate.

Using FIG. 1 as an example, the database 1 has only three database connections. One connection is the high-speed direct connection, and the other two are agent connections by means of the connection agent. Assuming that the database 1 supports 1024 database connections, the database 1 has very low load and has many redundant database connections. In this case, there may be no need to use the agent connection mode, and a higher access speed is obtained. The second threshold is a tipping point for determining whether the quantity of database connections is small and whether the high-speed direct connection may be established. How to set this value is not uniquely limited in this embodiment.

In this embodiment, the second threshold and the third threshold are tipping points for controlling the switching from the connection agent to the high-speed direct connection. An effect brought by specific setting of the thresholds may be obtained by means of theoretical derivation. Specific values of the thresholds may be set based on experience, or may be determined based on a load capability of a system. The specific values of the thresholds are not uniquely limited in this embodiment.

This embodiment of the present invention further provides an implementation solution of switching from a high-speed access to a database by using a high-speed direct connection to a low-speed access to a database implemented by using a connection agent. Details are as follows: After the establishing a database connection between the application and the second database, the method further includes:

determining whether the quantity of connections of the second database is greater than a fourth threshold and whether the traffic or the frequency of access by the application to the second database is less than a fifth threshold, where the fourth threshold is greater than or equal to the second threshold, and the fifth threshold is less than or equal to the third threshold; and if yes, breaking the database connection between the application and the second database, and establishing the database connection between the connection agent and the second database.

Specific values of the fourth threshold and the fifth threshold may be set based on experience, or may be determined based on a load capability of a system. The specific values are not uniquely limited in this embodiment. Technical effects of this embodiment are to implement a solution in which a high-speed connection is switched to a low-speed connection if the database is busy and the application accesses the busy database infrequently. The fourth threshold is a tipping value for determining, by means of the quantity of connections, that the database is busy. The fifth threshold is a tipping value for determining that the database is accessed infrequently. After the thresholds are set, an entire system may be tested to determine whether the thresholds are appropriate. The thresholds may be adjusted if they are not appropriate.

In this embodiment of the present invention, the connection agent may be implemented as a process, and an entire database system may have many connection agents. This embodiment of the present invention further provides a specific implementation solution of managing the connection agents as follows: Before the establishing, by the data access layer, a database connection between a connection agent and the second database, the method further includes:

obtaining, by the data access layer, an operating state of a current existing connection agent, and determining a target connection agent, where the target connection agent is a connection agent whose current operating state is idle; and establishing a communication connection between the application and the target connection agent, or if there is no idle connection agent and the quantity of connections that have been established by the second database has not exceeded a maximum quantity of connections supported by the second database, establishing a new connection agent as the target connection agent; and the establishing, by the data access layer, a database connection between a connection agent and the second database, and sending the access request to the second database by using the connection agent includes: establishing a database connection between the target connection agent and the second database, and sending the access request to the second database by using the target connection agent.

In this embodiment, if there is no idle connection agent, and establishment of a new connection agent is not established, an idle connection agent may be waited for until a waiting time has expired. An operating state of the connection agent may be actively reported by the connection agent to a related control module of the data access layer, and the related control module of the data access layer maintains information about the operating state of the connection agent. The operating state of the connection agent is extracted from the maintained information when needed by the data access layer. Alternatively, the data access layer may search for the operating state of the connection agent and then receive feedback of the connection agent. A specific implementation is not uniquely limited in this embodiment of the present invention.

This embodiment of the present invention further provides a solution of managing a quantity of the connection agents. Details are as follows: The method further includes:

recording the current existing connection agent, and recording a current operating state reported by the connection agent; and when a quantity of connection agents whose current operating states are idle is greater than a first threshold, deleting a redundant connection agent, where the redundant connection agent is determined according to a rule of balance between quantities of connections of databases.

In this embodiment, the first threshold may be set to a proportion, that is, a proportion of idle connection agents to total connection agents. Alternatively, the first threshold may be a value of a quantity. For example, if a quantity of the idle connection agents exceeds a value, some connection agents are deleted. How many connection agents are deleted may be arbitrarily determined. For example, connection agents are deleted until another specified proportion of idle connection agents is reached, or until a quantity of idle connection agents reaches a particular value. When the connection agent exists in a form of a subprocess, establishment of the connection agent may be establishment of the subprocess, and a process of deleting the connection agent may be a process of deleting the subprocess.

This embodiment of the present invention further provides a return implementation solution if the access request has result data. Details are as follows: The method further includes:

receiving result data corresponding to the access request, and if a database connection between a source end of the result data and the application exists, routing the result data to the application; otherwise, sending the result data to the application by using the connection agent.

It should be noted that result data of some access requests may not be returned, and therefore, there may not be a step of returning the result data.

The following embodiments describe the foregoing embodiments by using specific examples in the following four aspects:

1. An Apparatus for Initially Setting Database Speed QoS:

For example, a business & operation support system (Business & Operation Support System, BOSS) of a city bears eight million users, and a user information table has a very large data volume. To improve concurrency performance, data is divided into four in-memory databases according to number segments, and user information of different number segments is fragmented and stored in different databases. It is assumed as follows:

an APP1 application cluster is used to support various services of users born by the database 1, an APP2 application cluster is used to support various services of users born by the database 2, an APP3 application cluster is used to support various services of users born by the database 3, an APP4 application cluster is used to support various services of users born by the database 4, and each application cluster includes multiple processes, and initial access speed QoS of various application clusters to the databases are shown in Table 3:

TABLE 3

| Application | Data and node to be accessed | Speed QoS (access manner) | Alternate path | Remark |
| --- | --- | --- | --- | --- |
| APP1 | Database 1 | High-speed direct connection | Emergency agent | APP1 is used to serve users whose primary database is the database 1. |
| APP1 | Database 2 | Agent | Emergency agent | |
| APP1 | Database 3 | Agent | Emergency agent | |
| APP1 | Database 4 | Agent | Emergency agent | |
| APP2 | Database 1 | Agent | Emergency agent | |
| APP2 | Database 2 | High-speed direct connection | Emergency agent | APP2 is used to serve users whose primary database is the database 2. |
| APP2 | Database 3 | Agent | Emergency agent | |
| APP2 | Database 4 | Agent | Emergency agent | |
| ... | ... | ... | ... | ... |

A description of Table 3:

Each application cluster initially accesses a primary database by using the high-speed direct connection, and accesses a database that is not a primary database by using the connection agent (multiplex of database connection).

2. Speed QoS Processing Procedure (that is: Selection of a Database Connection Mode):

For example, a BOSS system of a province-level municipality bears 32 million users, and a user information table has a very large data volume. To improve concurrency performance, data is divided into eight in-memory databases according to numbers and number segments, and in this way, user information of different numbers is fragmented in different databases.

Data of a number A1 is at a database node 1, data of a number A2 is at a database node 2, and the number A1 and the number A2 form a family network and subscribe to a traffic sharing product. The number A1 shares a general packet radio service (General Packet Radio Service, GPRS) free resource with the number A2 for use.

When the number A2 is used on a network, the database node 1 is a primary database of the number A2 according to a routing and QoS rule, and the number A2 accesses the database node 1 by using the high-speed direct connection mode; and accesses other databases by using a data query agent because the other databases are not the primary database.

Figure 7:
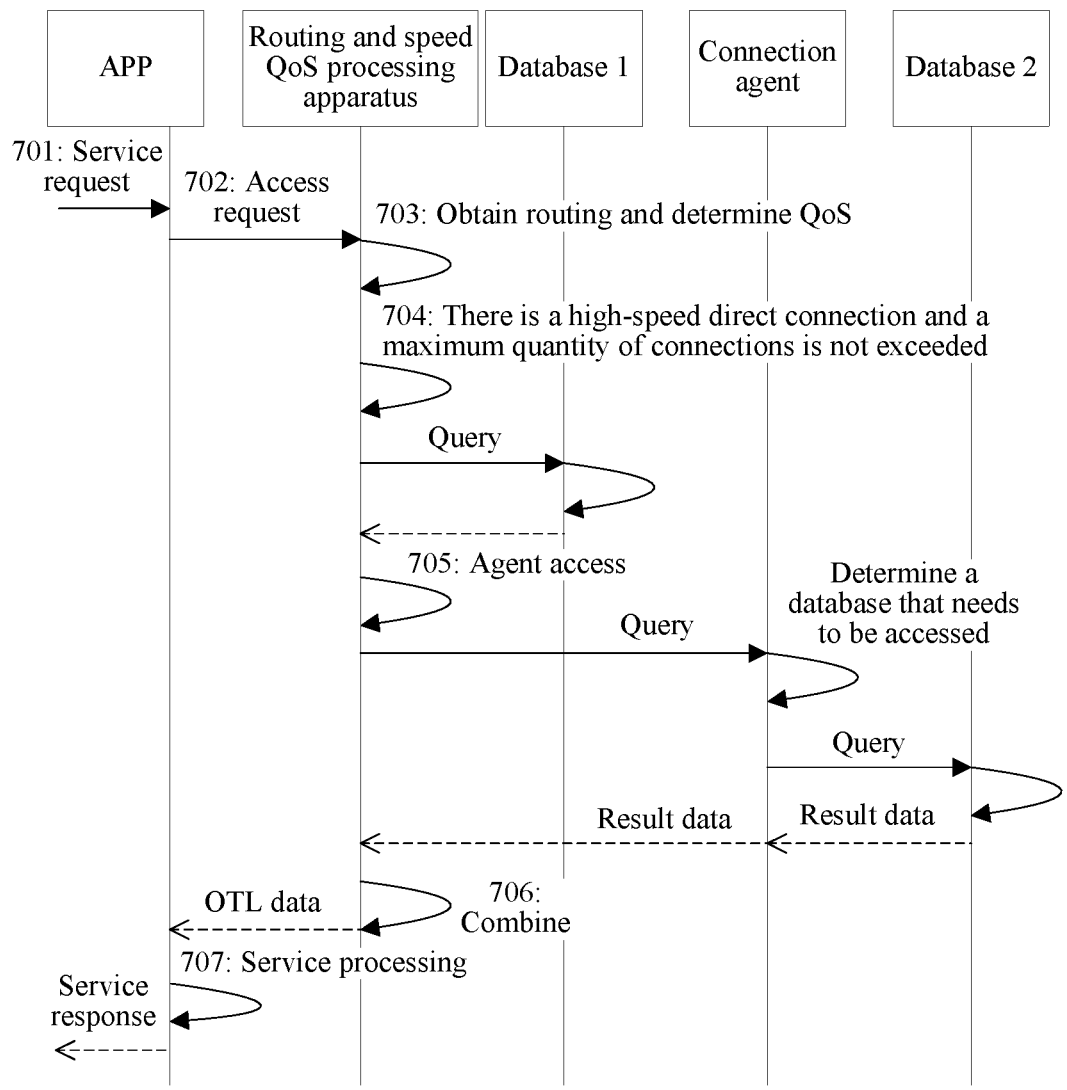
FIG. 7 is a schematic flowchart of a method according to an embodiment of the present invention.

A description of the procedure is shown in FIG. 7:

701: An application APP receives a service request.

702: The application converts the service request to an OTL access request, and sends the OTL access request to a routing and speed QoS processing apparatus.

703: The routing and speed QoS processing apparatus obtains routing information according to a service quantity partition key, and determines, according to speed QoS setting information of databases of data partitions, whether to access data by using a high-speed direct connection or a data query agent.

704: If a configuration option of a database of a data partition is the high-speed direct connection (it is assumed in FIG. 7 that a database 1 is accessed by using the high-speed direct connection), check whether a high-speed direct connection path currently exists; and if the high-speed direct connection path exists, directly perform querying by using the direction connection, or if the high-speed direct connection path does not exist, check whether the database of the data partition reaches a maximum quantity of connections, and if the maximum quantity of connections is not reached, establish a high-speed direct connection path, and access the database in a high-speed direct connection mode.

It may be understood that if the database of the data partition has reached the maximum quantity of connections, wait for a quantity of connections of the database of the data partition to decrease below the maximum quantity of connections until a waiting time has expired.

705: If the configuration option of the database is accessing by using the connection agent, check whether an access path for the connection agent currently exists, and if the access path for the connection agent exists, directly use the access path for the connection agent, or if the access path for the connection agent does not exist, establish a query path between the database and the connection agent, and access the database by using the data agent.

In the foregoing step, a process for establishing a query path between the database and the connection agent is as follows: After receiving a query instruction sent by the routing and speed QoS processing apparatus, the connection agent performs query to determine, by multiplexing a subprocess and a database connection, a database that needs to be accessed, that is, the database 2 shown in FIG. 7.

706: The routing and speed QoS processing apparatus receives result data forwarded by the connection agent, and the routing and speed QoS processing apparatus combines the obtained result data to obtain OTL data and transmits the OTL data to the application APP.

707: The application performs service processing on the obtained result data, and forms a service to correspondingly respond to peripheral calling.

3. A Process for Dynamically Adjusting a Database Connection Mode (Speed QoS):

A client A may travel from Shanghai to Beijing and Nanjing by airplane (high-speed), by high-speed railway (intermediate speed), or by expressway (low-speed). Different routing paths lead to a dramatic difference in costs. Generally, a higher speed indicates a higher cost, and a lower speed indicates a lower cost. To spend a shorter total traveling time (evaluation is comprehensively performed based on a time and an expense), the client may travel to Beijing by airplane and to Nanjing by high-speed railway.

Similarly, based on a speed QoS scheduling policy, a same application may access different databases in different manners.

The client A needs to travel to Nanjing and Hangzhou in April. The client A needs to travel to Hangzhou daily and to Nanjing once a month. To spend a shorter total travelling time (evaluation is comprehensively performed based on a time and an expense), the client A may choose to travel to Hangzhou by high-speed railway and to Nanjing by bus.

A client B needs to travel to Nanjing and Hangzhou in April. The client B needs to travel to Nanjing daily and to Hangzhou once a month. To spend a shorter total travelling time, the client B may choose to travel to Nanjing by high-speed railway and to Hangzhou by bus.

Similarly, based on a speed QoS scheduling policy, different applications may access a same database in different manners.

By means of a speed QoS scheduling adjustment apparatus of the data access layer DAL, policies may be set according to a scenario rule, and dynamic routing scheduling may be performed on a routing path of data for an application. In a scenario in which a high speed is needed, a high-speed path is selected, and in a scenario in which a low speed is needed, a low-speed path is selected, thereby obtaining an optimal price/performance ratio.

An example in which an online billing process (Call billing process, CBP) is connected to a QoS dynamic scheduling is described as follows:

For example, a database of a mobile billing system of a prefecture-level city is horizontally divided into three database nodes: a dbNode1, a dbNode2, and a dbNode3 according to mobile phone number segments. Each database node supports one million users, the online billing process (CBP) enables three processes, and a front-end load balancing scheduling module allocates, according to the number segments, data to three online billing processes (CBP) for bill processing. Characteristics of services are that the services are busy at daytime, and user access traffic gradually decreases at night and deceases to a lowest level in the early morning. The database dbNode1 bears many high-end brand users, but other database nodes bear a low-end brand Easy own.

(1) Configuration of a dynamic scheduling policy is shown in Table 4:

TABLE 4

| Policy number | Policy name | Description of policies |
|---|---|---|
| RuleId_1 | Database connection initialization policy | All processes are enabled and data is accessed by using a connection agent. |

TABLE 4-continued

| Policy number | Policy name | Description of policies |
|---|---|---|
| RuleId_2 | The agent mode is switched to the direct connection mode. | Switching condition: Total frequency at which an application accesses a database >5000 times/minute and lasts for more than 3 minutes; A proportion of access traffic to a database A exceeds 60%; 2) When a total quantity of connections to the database A has not exceeded 900, the connection mode is switched from the agent mode to the direct connection mode. |
| RuleId_3 | The direct connection mode is switched to the agent mode. | Switching condition: When total frequency at which an application accesses a database <5000 times/minute and lasts for more than 3 minutes, all connections are switched to the agent mode; When traffic of access of an application to a database A/a proportion of total traffic of access to a database <=40%, if the database A is accessed in the direct connection mode, the direct connection mode needs to be switched to the agent mode. |

(2) Programs are enabled, and initialization states of database connections of processes are shown in Table 5.

TABLE 5

| Application | Data and node to be accessed | Speed QoS (access manner) | Alternate path | Remark |
|---|---|---|---|---|
| CBP1 | dbNode1 | Agent | Emergency agent | Processing according to a policy RuleId_1 |
| CBP1 | dbNode2 | Agent | Emergency agent | Processing according to a policy RuleId_1 |
| CBP1 | dbNode3 | Agent | Emergency agent | Processing according to a policy RuleId_1 |
| CBP2 | dbNode1 | Agent | Emergency agent | Processing according to a policy RuleId_1 |
| CBP2 | dbNode2 | Agent | Emergency agent | Processing according to a policy RuleId_1 |
| CBP2 | dbNode3 | Agent | Emergency agent | Processing according to a policy RuleId_1 |
| CBP3 | dbNode1 | Agent | Emergency agent | Processing according to a policy RuleId_1 |
| CBP3 | dbNode2 | Agent | Emergency agent | Processing according to a policy RuleId_1 |
| CBP3 | dbNode3 | Agent | Emergency agent | Processing according to a policy RuleId_1 |

(3) Services of users are relatively busy at daytime (8:00-20:00), and policies are dynamically adjusted according to a database connection mode (speed QoS). Results of adjustment are shown in Table 6.

TABLE 6

| Application | Data and node to be accessed | Speed QoS (access manner) | Alternate path | Remark |
|---|---|---|---|---|
| CBP1 | dbNode1 | High-speed direct connection | Emergency agent | Satisfying a policy RuleId_2 |
| CBP1 | dbNode2 | Agent | Emergency agent | Processing according to a policy RuleId_1 |
| CBP1 | dbNode3 | Agent | Emergency agent | Processing according to a policy RuleId_1 |
| CBP2 | dbNode1 | Agent | Emergency agent | Processing according to a policy RuleId_1 |
| CBP2 | dbNode2 | High-speed direct connection | Emergency agent | Satisfying a policy RuleId_2 |
| CBP2 | dbNode3 | Agent | Emergency agent | Processing according to a policy RuleId_1 |
| CBP3 | dbNode1 | Agent | Emergency agent | Processing according to a policy RuleId_1 |

TABLE 6-continued

| Application | Data and node to be accessed | Speed QoS (access manner) | Alternate path | Remark |
|---|---|---|---|---|
| CBP3 | dbNode2 | Agent | Emergency agent | Processing according to a policy RuleId__1 |
| CBP3 | dbNode3 | High-speed direct connection | Emergency agent | Satisfying a policy RuleId__2 |

(4) At night (20:00-23:00), except the database dbNode1 that is actively accessed because the database dbNode1 has many users of the GoTone brand, other database nodes that have very little access traffic need to be adjusted from the direct connection mode to the agent mode, so that database load for the application is reduced and the database bears other services. As shown in FIG. 7:

TABLE 7

| Application | Data and node to be accessed | Speed QoS (access manner) | Alternate path | Remark |
|---|---|---|---|---|
| CBP1 | dbNode1 | High-speed direct connection | Emergency agent | Satisfying a policy RuleId__2 |
| CBP1 | dbNode2 | Agent | Emergency agent | Satisfying a policy RuleId__1 |
| CBP1 | dbNode3 | Agent | Emergency agent | Satisfying a policy RuleId__1 |
| CBP2 | dbNode1 | Agent | Emergency agent | Satisfying a policy RuleId__1 |
| CBP2 | dbNode2 | Agent | Emergency agent | Satisfying a policy RuleId__3 |
| CBP2 | dbNode3 | Agent | Emergency agent | Satisfying a policy RuleId__1 |
| CBP3 | dbNode1 | Agent | Emergency agent | Satisfying a policy RuleId__1 |
| CBP3 | dbNode2 | Agent | Emergency agent | Satisfying a policy RuleId__1 |
| CBP3 | dbNode3 | Agent | Emergency agent | Satisfying a policy RuleId__3 |

Figure 8:
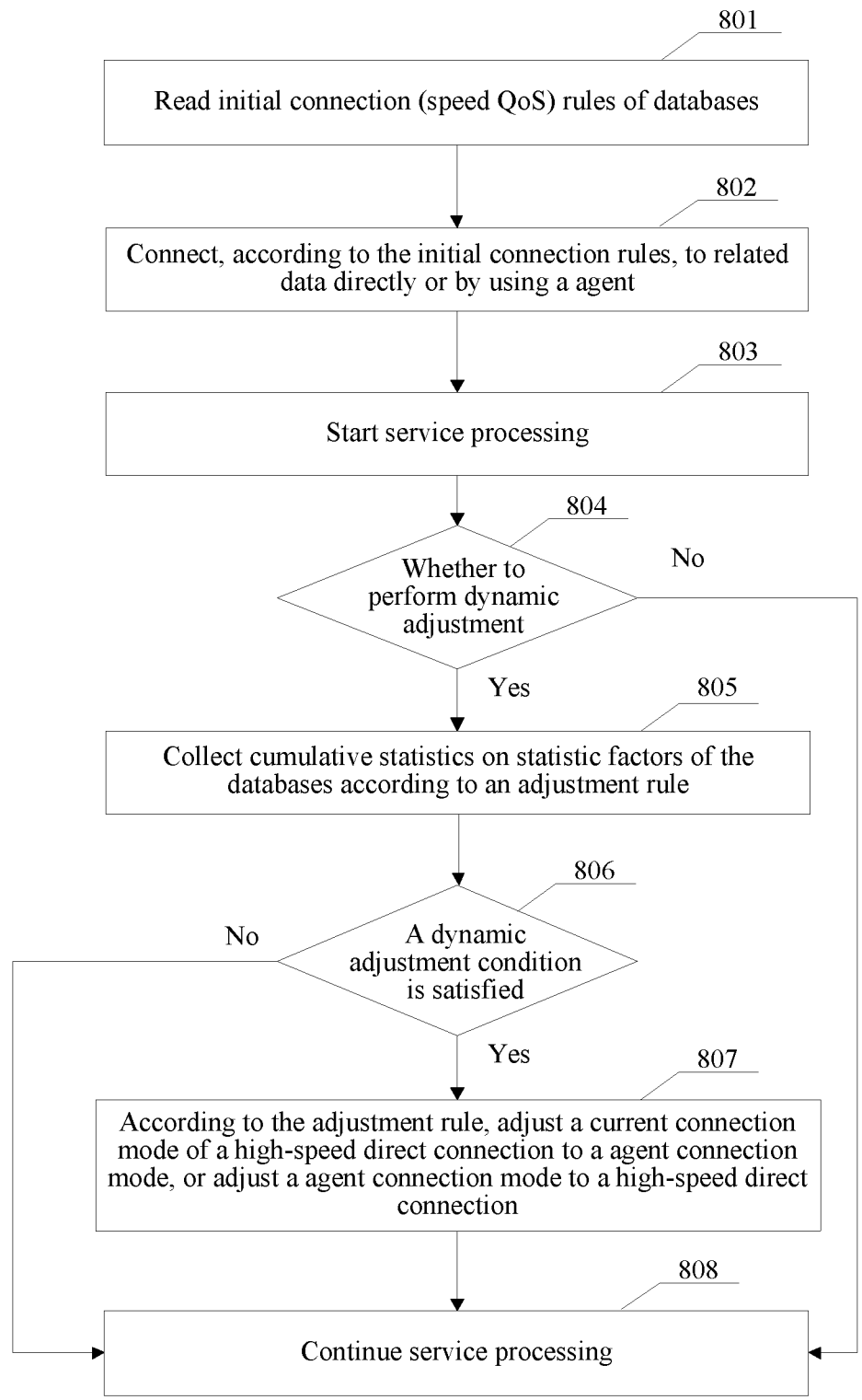
FIG. 8 is a schematic flowchart of a method according to an embodiment of the present invention.

(5) In the early morning (24:00-00:50), accesses of all users are inactive, database nodes have very low access traffic and need to be adjusted from the direct connection mode to the agent mode, so that database load of the application is reduced and the database bears other services. As shown in FIG. 8:

TABLE 8

| Application | Data and node to be accessed | Speed QoS (access manner) | Alternate path | Remark |
|---|---|---|---|---|
| CBP1 | dbNode1 | Agent | Emergency agent | Satisfying a policy RuleId__3 |
| CBP1 | dbNode2 | Agent | Emergency agent | Satisfying a policy RuleId__1 |
| CBP1 | dbNode3 | Agent | Emergency agent | Satisfying a policy RuleId__1 |
| CBP2 | dbNode1 | Agent | Emergency agent | Satisfying a policy RuleId__1 |
| CBP2 | dbNode2 | Agent | Emergency agent | Satisfying a policy RuleId__3 |
| CBP2 | dbNode3 | Agent | Emergency agent | Satisfying a policy RuleId__1 |
| CBP3 | dbNode1 | Agent | Emergency agent | Satisfying a policy RuleId__1 |
| CBP3 | dbNode2 | Agent | Emergency agent | Satisfying a policy RuleId__1 |
| CBP3 | dbNode3 | Agent | Emergency agent | Satisfying a policy RuleId__3 |

Based on the foregoing descriptions of the examples, an embodiment of the present invention provides a process for processing dynamic adjustment of speed QoS. As shown in FIG. 8, the process includes the following steps:

801: Enable an application, and a routing and speed QoS management module reads initial connection (speed QoS) rules of databases. For the initial connection rules, refer to the examples in Table 5.

802: Connect, according to the initial connection rules, to related data directly or by using an agent.

803: When an initial connection is established, the application processes a service.

804: Determine, according to the configuration rule, whether a database connection mode needs to be dynamically adjusted.

This is a trigger condition for triggering determining whether dynamic adjustment is needed. In this step, determining whether dynamic adjustment is needed may be determining whether a periodical trigger point is reached, or there may be other conditions for determining. This step may not be performed, and the next step of statistics collection is directly performed. For whether to perform dynamic adjustment, refer to the dynamic scheduling policies listed in Table 4.

805: If dynamic adjustment is needed, collect cumulative statistics on transactions according to statistic factors (a quantity of processed services and a cumulative processing time) of the databases.

806: Start a new transaction after a previous transaction is completed, and determine whether a dynamic adjustment condition is satisfied.

807: If yes, according to an adjustment rule, adjust a current connection mode of a high-speed direct connection to an agent connection mode, or adjust an agent connection mode to a high-speed direct connection.

Specifically, for example, the database currently uses the agent connection mode and satisfies a requirement of a data QoS rule for adjustment to an access manner of the high-speed direct connection, and then a current maximum quantity of connections of the database is obtained by querying. If the current total quantity of connections is less than a maximum quantity of connections that is permitted, the high-speed direct connection is enabled, a current connection to an agent is broken, and related services are processed. Otherwise, an infrequently-used high-speed direct connection is adjusted to the agent connection mode. For an example of how to specifically perform adjustment, refer to the specific examples shown in Table 6, Table 7, or Table 8.

808: Continue service processing.

In the foregoing procedure, step 804 to step 808 are repeated until running of the program ends.

Figure 9:
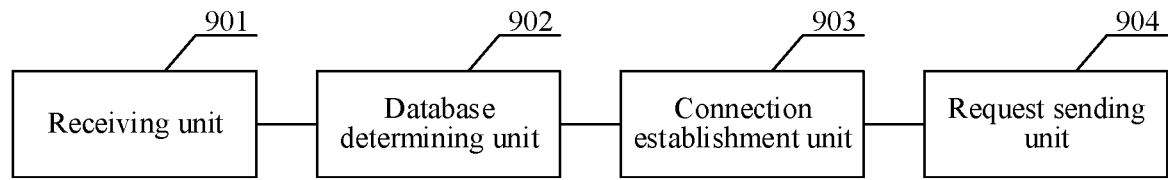
FIG. 9 is a schematic structural diagram of an apparatus according to an embodiment of the present invention.

An embodiment of the present invention further provides a database access control apparatus, applied to a database system, where the database system has at least two databases, and the at least two databases include a first database and a second database; a database connection is established between an application and the first database; and the database access control apparatus is located at a data access layer and may exist in a form of entity hardware. As shown in FIG. 9, the apparatus includes:

a receiving unit 901, configured to receive an access request from the application;

a database determining unit 902, configured to determine that a target database to which the access request is sent is a second database;

a connection establishment unit 903, configured to establish a database connection between a connection agent and the second database; and a request sending unit 904, configured to send the access request to the second database by using the connection agent.

In this embodiment of the present invention, an application and a database are connected in two modes. One mode is a high-speed direct connection mode, and in this mode, a database connection is established between the application and the database. The other mode is a relatively-low-speed connection mode, and in this mode, a connection to the database is established by means of a connection agent. In this way, not only a requirement on high-speed access may be ensured, but also convergence of a database connection may be implemented by using the connection agent, so as to reduce a required quantity of database connections. Therefore, linear scale-out of database applications can be implemented, and database connection resources can be saved.

Further, this embodiment of the present invention further provides a processing procedure in which the application accesses the database by using a high-speed direct connection mode. Details are as follows: The database determining unit 902 is further configured to determine that the target database to which the access request is sent is a first database; and the request sending unit 904 is configured to send the access request to the first database by using the database connection between the application and the first database.

Figure 10:
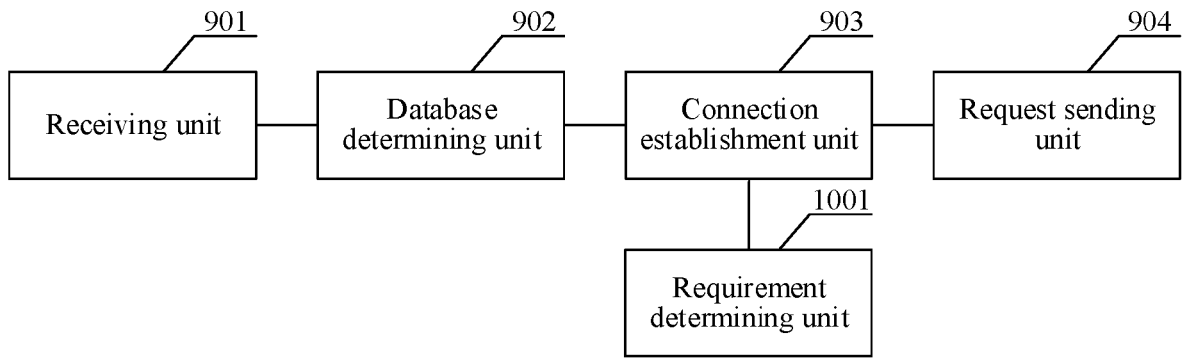
FIG. 10 is a schematic structural diagram of an apparatus according to an embodiment of the present invention.

Further, this embodiment further provides a solution of managing a connection based on an access speed requirement. Details are as follows: As shown in FIG. 10, the apparatus further includes:

a requirement determining unit 1001, configured to determine an access speed requirement of the access request, where the connection establishment unit 903 is further configured to: if the access speed requirement belongs to a high-speed direct connection type, establish the database connection between the application and the first database; or a primary database of the application is the first database, and the database connection between the application and the first database is a pre-configured database connection.

In the solution of managing the database connection of the high-speed direct connection by a same data access layer, this embodiment of the present invention further provides a solution of how to establish a high-speed direct connection. Details are as follows: The connection establishment unit 903 is further configured to: before establishing the database connection between the application and the first database, determine that currently the database connection between the application and the first database does not exist, and that the first database has not reached a maximum quantity of connections, and establish the database connection between the application and the first database.

Figure 11:
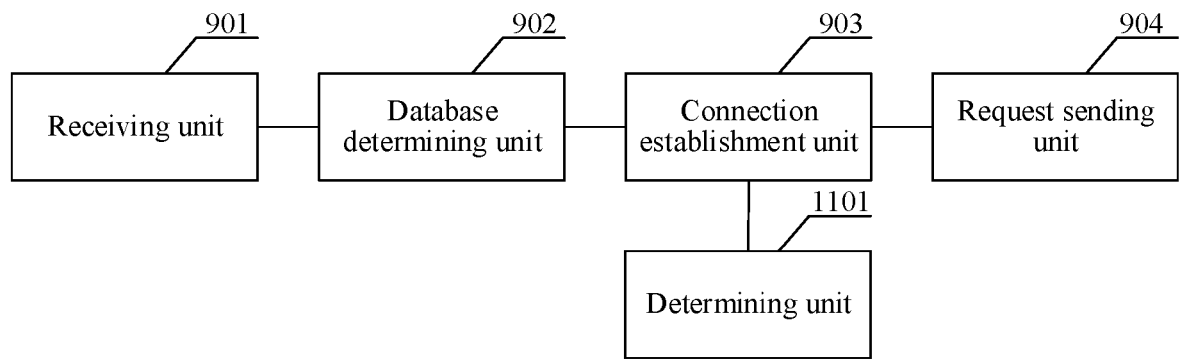
FIG. 11 is a schematic structural diagram of an apparatus according to an embodiment of the present invention.

Further, this embodiment of the present invention further provides an implementation solution of switching from a low-speed access to a database implemented by using a connection agent to a high-speed access to a database implemented by using a high-speed direct connection. As shown in FIG. 11, the apparatus further includes:

a determining unit 1101, configured to: before the database connection between the connection agent and the second database is established, determine whether a quantity of connections of the second database is less than a second threshold and whether traffic or frequency of access by the application to the second database is greater than a third threshold, where the connection establishment unit 903 is configured to: if a result determined by the determining unit 1101 is yes, establish a database connection between the application and the second database; otherwise, establish the database connection between the connection agent and the second database.

This embodiment of the present invention further provides an implementation solution of switching from a high-speed access to a database by using a high-speed direct connection to a low-speed access to a database implemented by using a connection agent. Details are as follows: The determining unit 1101 is further configured to: after the database connection between the application and the second database is established, determine whether the quantity of connections of the second database is greater than a fourth threshold and whether the traffic or the frequency of access by the application to the second database is less than a fifth threshold, where the fourth threshold is greater than or equal to the second threshold, and the fifth threshold is less than or equal to the third threshold; and the connection establishment unit 903 is configured to: if a result determined by the determining unit 1101 is yes, break the database connection between the application and the second database, and establish the database connection between the connection agent and the second database.

Figure 12:
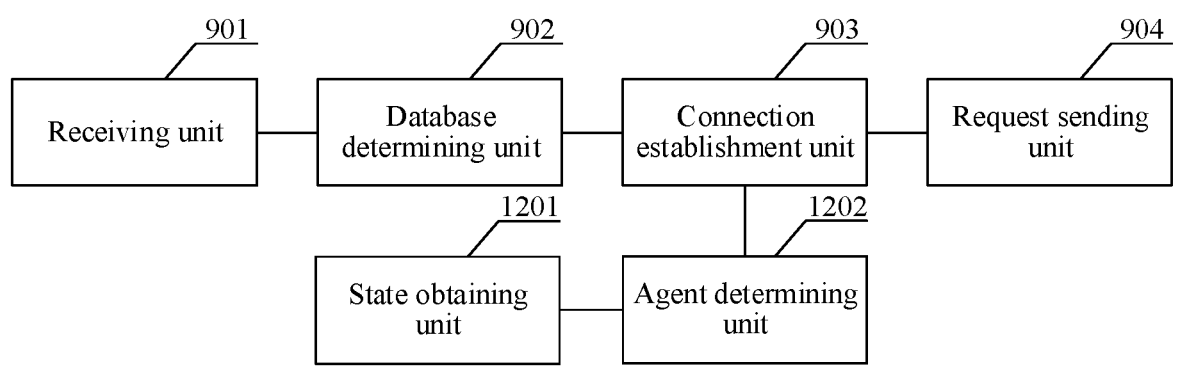
FIG. 12 is a schematic structural diagram of an apparatus according to an embodiment of the present invention.

In this embodiment of the present invention, the connection agent may be implemented as a process, and an entire database system may have many connection agents. This embodiment of the present invention further provides a specific implementation solution of managing the connection agents as follows: As shown in FIG. 12, the apparatus further includes:

a state obtaining unit 1201, configured to: before the database connection between the connection agent and the second database is established, obtain an operating state of a current existing connection agent; and an agent determining unit 1202, configured to determine a target connection agent, where the target connection agent is a connection agent whose current operating state is idle, where the connection establishment unit 903 is configured to: establish a communication connection between the application and the target connection agent, or if there is no idle connection agent and the quantity of connections that have been established by the second database has not exceeded a maximum quantity of connections supported by the second database, establish a new connection agent as the target connection agent; and establish a database connection between the target connection agent and the second database; and the request sending unit 904 is configured to send the access request to the second database by using the target connection agent.

Figure 13:
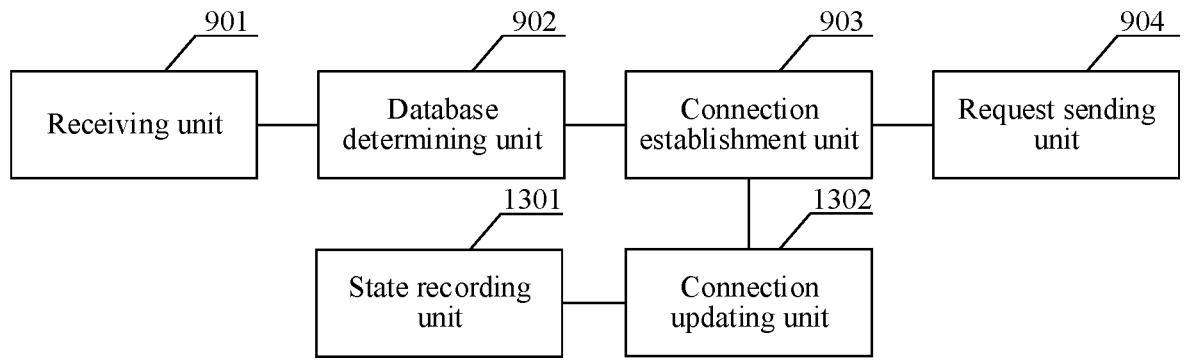
FIG. 13 is a schematic structural diagram of an apparatus according to an embodiment of the present invention.

Further, this embodiment of the present invention further provides a solution of managing a quantity of the connection agents. As shown in FIG. 13, the apparatus further includes:

a state recording unit 1301, configured to: record the current existing connection agent, and record a current operating state reported by the connection agent; and a connection updating unit 1302, configured to: when a quantity of connection agents whose current operating states are idle is greater than a first threshold, delete a redundant connection agent, where the redundant connection agent is determined according to a rule of balance between quantities of connections of databases.

Figure 14:
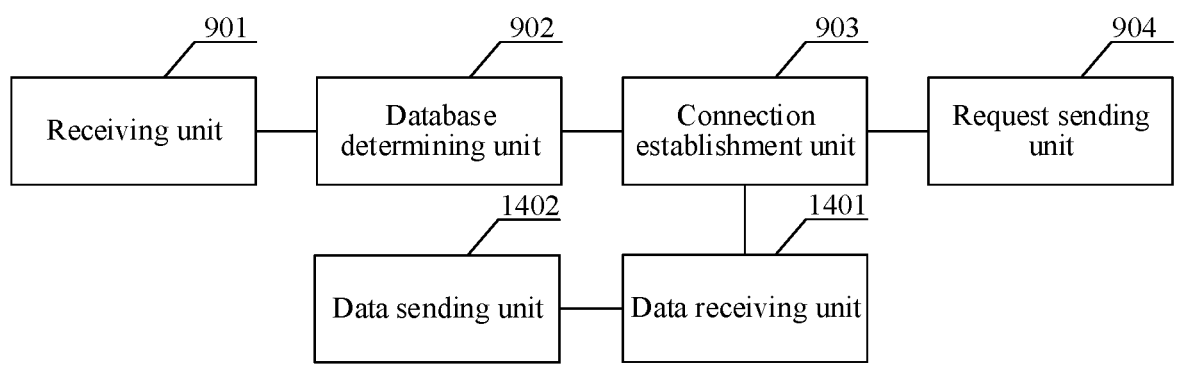
FIG. 14 is a schematic structural diagram of an apparatus according to an embodiment of the present invention.

This embodiment of the present invention further provides a return implementation solution if the access request has result data. As shown in FIG. 14, the apparatus further includes:

a data receiving unit 1401, configured to receive result data corresponding to the access request; and a data sending unit 1402, further configured to: if a database connection between a source end of the result data and the application exists, route the result data to the application; otherwise, send the result data to the application by using the connection agent.

For execution content and effects of the units in a structure of the apparatus in this embodiment of the present invention, refer to the method embodiments, and details are not described herein again.

Figure 15:
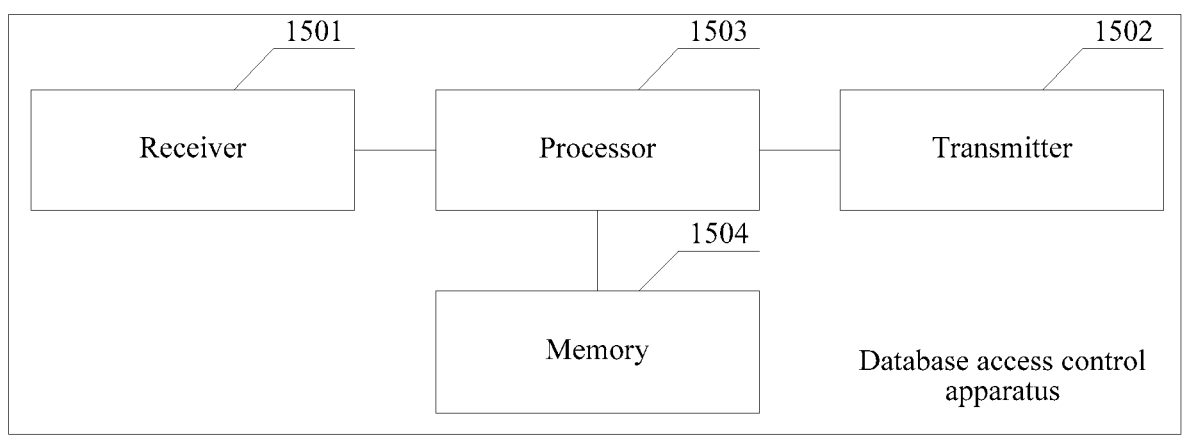
FIG. 15 is a schematic structural diagram of an apparatus according to an embodiment of the present invention.

An embodiment of the present invention further provides another database access control apparatus, applied to a database system, where the database system has at least two databases, and the at least two databases include a first database and a second database; and a database connection is established between an application and the first database. As shown in FIG. 15, the apparatus includes: a receiver 1501, a transmitter 1502, a processor 1503, and a memory 1504. The database may be located in the memory 1504, or may be located in a memory of another device.

The processor 1503 is configured to: receive an access request from the application, and determine that a target database to which the access request is sent is the second database; establish a database connection between a connection agent and the second database, and send the access request to the second database by using the connection agent.

An application and a database are connected in two modes. One mode is a high-speed direct connection mode, and in this mode, a database connection is established between the application and the database. The other mode is a relatively-low-speed connection mode, and in this mode, a connection to the database is established by means of a connection agent. In this way, not only a requirement on high-speed access may be ensured, but also convergence of a database connection may be implemented by using the connection agent, so as to reduce a required quantity of database connections. Therefore, linear scale-out of database applications can be implemented, and database connection resources can be saved.

The processor 1503 is further configured to: determine that the target database to which the access request is sent is a first database; and send the access request to the first database by using the database connection between the application and the first database.

The processor 1503 is specifically configured to: determine an access speed requirement of the access request, and if the access speed requirement belongs to a high-speed direct connection type, establish the database connection between the application and the first database; or a primary database of the application is the first database, and the database connection between the application and the first database is a pre-configured database connection.

The processor 1503 is further configured to: before establishing the database connection between the application and the first database, determine that currently the database connection between the application and the first database does not exist, and that the first database has not reached a maximum quantity of connections, and establish the database connection between the application and the first database.

The processor 1503 is further configured to: before establishing the database connection between the connection agent and the second database, determine whether a quantity of connections of the second database is less than a second threshold and whether traffic or frequency of access by the application to the second database is greater than a third threshold, and if yes, establish a database connection between the application and the second database; otherwise, establish the database connection between the connection agent and the second database.

The processor 1503 is further configured to: after establishing the database connection between the application and the second database, determine whether the quantity of connections of the second database is greater than a fourth threshold and whether the traffic or the frequency of access by the application to the second database is less than a fifth threshold, where the fourth threshold is greater than or equal to the second threshold, and the fifth threshold is less than or equal to the third threshold; and if yes, break the database connection between the application and the second database, and establish the database connection between the connection agent and the second database.

The processor 1503 is further configured to: before establishing the database connection between the connection agent and the second database, obtain an operating state of a current existing connection agent, and determine a target connection agent, where the target connection agent is a connection agent whose current operating state is idle; and establish a communication connection between the application and the target connection agent, or if there is no idle connection agent and the quantity of connections that have been established by the second database has not exceeded a maximum quantity of connections supported by the second database, establish a new connection agent as the target connection agent; and the establishing a database connection between a connection agent and the second database, and sending the access request to the second database by using the connection agent includes: establishing a database connection between the target connection agent and the second database, and sending the access request to the second database by using the target connection agent.

The processor 1503 is further configured to: record the current existing connection agent, and record a current operating state reported by the connection agent; and when a quantity of connection agents whose current operating states are idle is greater than a first threshold, delete a redundant connection agent, where the redundant connection agent is determined according to a rule of balance between quantities of connections of databases.

The processor 1503 is further configured to: receive result data corresponding to the access request, and if a database connection between a source end of the result data and the application exists, route the result data to the application; otherwise, send the result data to the application by using the connection agent.

Figure 16:
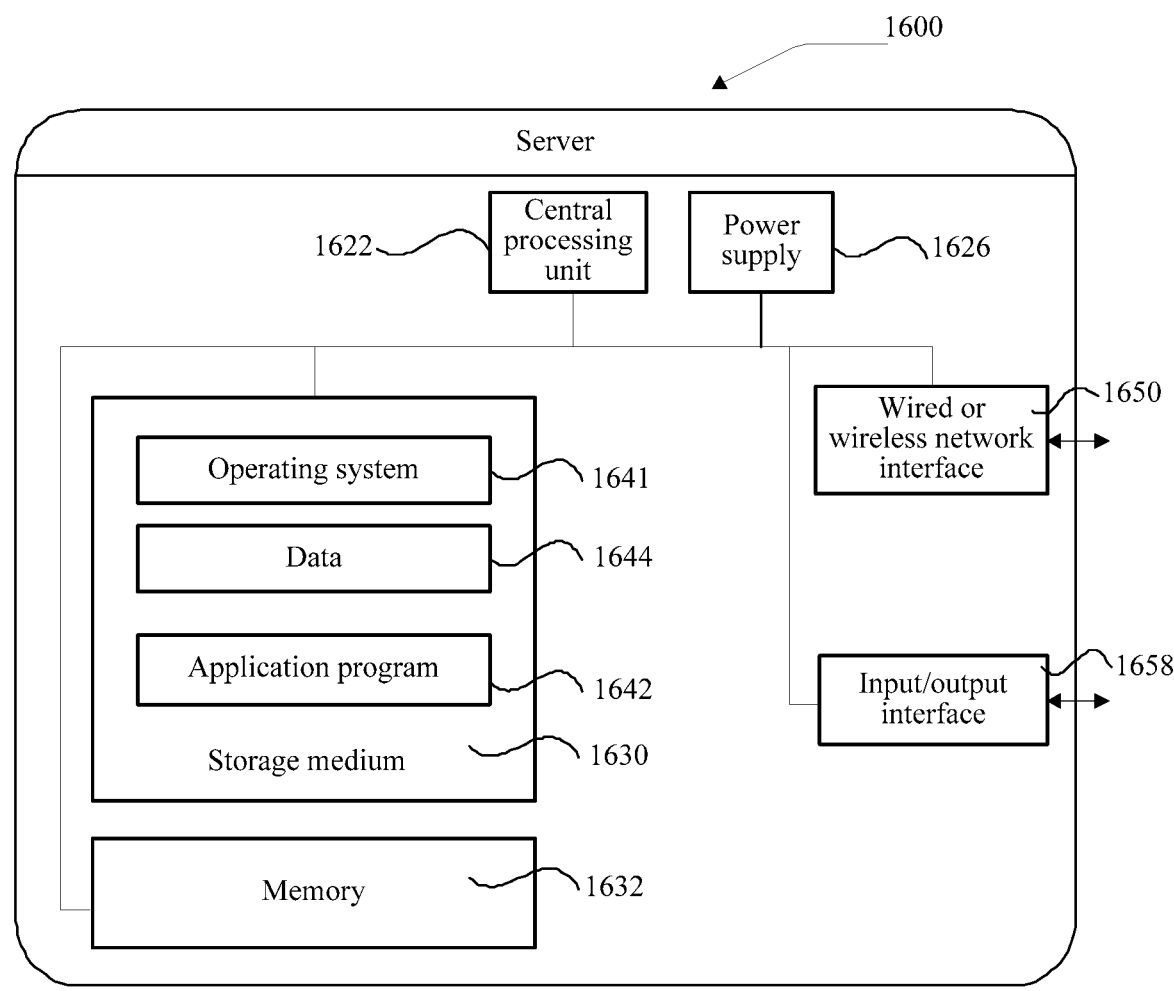
FIG. 16 is a schematic structural diagram of a server according to an embodiment of the present invention.

FIG. 16 is a schematic structural diagram of a server according to an embodiment of the present invention. The server 1600 maybe greatly different due to different configuration or performance, and may include one or more central processing units (central processing units, CPU) 1622 (for example, one or more processors), a memory 1632, or one or more storage mediums 1630 (for example, one or more mass storage devices) that store an application program 1642 or data 1644. The memory 1632 and the storage medium 1630 may be transient storages or persistent storages. A program stored in the storage medium 1630 may include one or more modules (not shown in the figure), and each module may include a series of instruction operations in the server. Furthermore, the central processing unit 1622 may be configured to communicate with the storage medium 1630, and perform, in the server 1600, a series of instruction operations in the storage medium 1630.

The server 1600 may further include one or more power supplies 1626, one or more wired or wireless network interfaces 1650, one or more input/output interfaces 1658, and/or one or more operating systems 1641 such as Windows Server™, Mac OS X™, Unix™, Linux™, and FreeBSD™.

The steps of the method embodiments in the foregoing embodiments may be based on the structure of the server shown in FIG. 16. Sometimes, the data access layer is also referred to as a persistent layer whose function is responsible for accessing to a database. In simple words, the data access layer implements operations such as selecting (select), inserting (insert), updating (update), and deleting (delete) a data table. Multiple databases may be located at a storage medium in a server, or may be located at a storage medium of another device. This is not uniquely limited in this embodiment of the present invention.

It should be noted that, in the foregoing apparatus embodiments, the unit division is merely logical function division, but the present invention is not limited to the foregoing division, as long as corresponding functions can be implemented. In addition, specific names of the functional units are merely provided for the purpose of distinguishing the units from one another, but are not intended to limit the protection scope of the present invention.

In addition, a person of ordinary skill in the art may understand that all or a part of the steps of the method embodiments may be implemented by a program instructing relevant hardware. The program may be stored in a computer readable storage medium. The storage medium may include: a read-only memory, a magnetic disk, or an optical disc.

The foregoing descriptions are merely examples of implementations of the present invention, but are not intended to limit the protection scope of the present invention. Any variation or replacement readily figured out by a person skilled in the art within the technical scope disclosed in the embodiments of the present invention shall fall within the protection scope of the present invention. Therefore, the protection scope of the present invention shall be subject to the protection scope of the claims.

What is claimed is:

1. A database access control method, applied to a database system, wherein the database system has at least two databases, and the at least two databases comprise a first database and a second database; and a database connection is established between an application and the first database, wherein the method comprises:
   receiving, by a data access layer, an access request from the application;
   determining that a target database to which the access request is sent is the second database;
   determining whether a quantity of connections of the second database is less than a second threshold and whether traffic or frequency of access by the application to the second database is greater than a third threshold;
   in response to determining that the quantity of connections of the second database is not less than the second threshold or that the traffic or frequency of access by the application to the second database is not greater than the third threshold, establishing, by the data access layer, a database connection between a connection agent and the second database; and
   sending the access request to the second database by using the connection agent.

2. The method according to claim 1, wherein the database connection between the application and the first database is established by:
   determining an access speed requirement of the access request; and
   in response to the access speed requirement being a high-speed direct connection type, establishing the database connection between the application and the first database.

3. The method according to claim 2, wherein the method further comprises:
   prior to establishing the database connection between the application and the first database, determining that the database connection between the application and the first database does not exist and that the first database has not reached a maximum quantity of connections; and
   in response to determining that the database connection between the application and the first database does not exist and that the first database has not reached the maximum quantity of connections, establishing the database connection between the application and the first database.

4. The method according to claim 1, wherein a primary database of the application is the first database, and the database connection between the application and the first database is a pre-configured database connection.

5. The method according to claim 1, wherein the method further comprises:
   prior to the establishing the database connection between the connection agent and the second database:
      obtaining, by the data access layer, an operating state of a current existing connection agent;

identifying a target connection agent, wherein the target connection agent's current operating state is idle; and
establishing a communication connection between the application and the target connection agent;
wherein establishing the database connection between the connection agent and the second database comprises establishing a database connection between the target connection agent and the second database; and
wherein sending the access request to the second database by using the connection agent comprises sending the access request to the second database by using the target connection agent.

6. The method according to claim 1, wherein the method further comprises:
prior to establishing the database connection between the connection agent and the second database:
obtaining, by the data access layer, an operating state of a current existing connection agent;
determining that there is no idle connection agent and a quantity of connections that have been established by the second database has not exceeded a maximum quantity of connections supported by the second database; and
in response to determining that there is no idle connection agent and a quantity of connections that have been established by the second database has not exceeded a maximum quantity of connections supported by the second database, establishing a new connection agent as a target connection agent;
wherein establishing the database connection between the connection agent and the second database comprises establishing a database connection between the target connection agent and the second database; and
wherein sending the access request to the second database by using the connection agent comprises sending the access request to the second database by using the target connection agent.

7. The method according to claim 1, further comprising:
receiving result data corresponding to the access request;
if a database connection between a source end of the result data and the application exists, routing the result data to the application; and
if the database connection between the source end of the result data and the application does not exist, sending the result data to the application by using the connection agent.

8. A database access control method, applied to a database system, wherein the database system has at least two databases, and the at least two databases comprise a first database and a second database; and a database connection is established between an application and the first database, wherein the method comprises:
receiving, by a data access layer, an access request from the application;
determining that a target database to which the access request is sent is the second database;
determining whether a quantity of connections of the second database is less than a second threshold and whether traffic or frequency of access by the application to the second database is greater than a third threshold;
in response to determining that the quantity of connections of the second database is less than the second threshold and that the traffic or frequency of access by the application to the second database is greater than the third threshold, establishing a database connection between the application and the second database;
after establishing the database connection between the application and the second database, determining whether the quantity of connections of the second database is greater than a fourth threshold and whether the traffic or the frequency of access by the application to the second database is less than a fifth threshold, wherein the fourth threshold is greater than or equal to the second threshold, and the fifth threshold is less than or equal to the third threshold; and
in response to determining that the quantity of connections of the second database is greater than a fourth threshold or that the traffic or the frequency of access by the application to the second database is less than a fifth threshold:
breaking the database connection between the application and the second database; and
establishing a database connection between the connection agent and the second database.

9. The method according to claim 8, wherein the database connection between the application and the first database is established by:
determining an access speed requirement of the access request; and
in response to the access speed requirement being a high-speed direct connection type, establishing the database connection between the application and the first database.

10. The method according to claim 9, wherein the method further comprises:
prior to establishing the database connection between the application and the first database:
determining that the database connection between the application and the first database does not exist and that the first database has not reached a maximum quantity of connections; and
in response to determining that the database connection between the application and the first database does not exist and that the first database has not reached the maximum quantity of connections, establishing the database connection between the application and the first database.

11. The method according to claim 8, wherein a primary database of the application is the first database, and the database connection between the application and the first database is a pre-configured database connection.

12. A database access control method, applied to a database system, wherein the database system has at least two databases, and the at least two databases comprise a first database and a second database; and a database connection is established between an application and the first database, wherein the method comprises:
receiving, by a data access layer, an access request from the application;
determining that a target database to which the access request is sent is the second database;
obtaining, by the data access layer, an operating state of a current existing connection agent;
identifying a target connection agent, wherein the target connection agent's current operating state is idle;
establishing a communication connection between the application and the target connection agent;
subsequently establishing, by the data access layer, a database connection between a connection agent and the second database, wherein establishing the database connection between the connection agent and the second database comprises establishing a database connection between the target connection agent and the second database; and sending the access request to the second database by using the connection agent, wherein sending the access request to the second database by using the connection agent comprises sending the access request to the second database by using the target connection agent, recording the current existing connection agent;

recording a current operating state reported by the connection agent; and when a quantity of connection agents whose current operating states are idle is greater than a first threshold, deleting a redundant connection agent, wherein the redundant connection agent is determined according to a rule of balance between quantities of connections of databases.

* * * * *